United States Patent [19]
Goodman et al.

[11] Patent Number: 5,929,896
[45] Date of Patent: Jul. 27, 1999

[54] RF BROADCAST SYSTEM UTILIZING INTERNAL TELEPHONE LINES

[75] Inventors: David D. Goodman, Arlington, Va.; Robert H. Domnitz, Lexington, Mass.; Terry G. Mahn, McLean, Va.

[73] Assignee: Inline Connection Corporation, Arlington, Va.

[21] Appl. No.: 08/670,216

[22] Filed: Jun. 21, 1996

Related U.S. Application Data

[63] Continuation of application No. 08/546,420, Oct. 20, 1995, which is a continuation of application No. 08/376,403, Jan. 23, 1995, abandoned, which is a continuation of application No. 08/245,577, May 18, 1994, abandoned, which is a continuation of application No. 08/114,974, Aug. 31, 1993, abandoned, which is a continuation of application No. 07/803,196, Dec. 5, 1991, abandoned, which is a continuation-in-part of application No. 07/688,864, Apr. 19, 1991, abandoned, which is a continuation of application No. 07/379,751, Jul. 14, 1989, Pat. No. 5,010,399.

[51] Int. Cl.⁶ .................................................. H04M 11/00
[52] U.S. Cl. .......................... 348/14; 348/17; 379/90.01; 379/102.03; 359/146
[58] Field of Search .................................. 379/64, 65, 90, 379/101, 102, 104, 105, 96–98, 93, 90.01, 93.01, 93.05–93.09, 93.14, 93.15, 93.26, 101.01, 102.01–102.03, 102.07; 348/14, 17–19, 734, 10; 359/142, 145–148; 455/402

[56] References Cited

U.S. PATENT DOCUMENTS

| | | | |
|---|---|---|---|
| 3,723,653 | 3/1973 | Tatsuzawa | 179/2 TV |
| 3,937,889 | 2/1976 | Bell, III et al. | 179/2 DP |
| 3,974,337 | 8/1976 | Tatsuzawa | 179/2 TV |

(List continued on next page.)

FOREIGN PATENT DOCUMENTS

| | | |
|---|---|---|
| 0 062 442 | 10/1982 | European Pat. Off. . |
| 0 408 236 | 1/1991 | European Pat. Off. . |
| 1-27358 | 1/1989 | Japan . |
| 2 166322 | 4/1986 | United Kingdom . |
| 2 166328 | 4/1986 | United Kingdom . |
| WO 88/05979 | 8/1988 | WIPO . |

OTHER PUBLICATIONS

"Commtek Corporation Announces First Commercially Available Transmission of Real–Time Video and Voice on Unshielded Twisted Pair Telephone Lines," News Release, Commtek Corp., 4 pages, 1992.

Hofmann, "Cable, Television, and the Consumer Electronic Bus," The Int'l T.V. Symposium—Montreux, Switzerland, pp. 165–173, 1987.

Johnson, "Videohub Cuts Costs, Opens Options," Data Communications, *Data Communications*, pp. 109–110, 1992.

Nichols, "Build A Pair of Line–Carrier Modems, " pp. 87–91, 1988.

(List continued on next page.)

*Primary Examiner*—Wing F. Chan
*Attorney, Agent, or Firm*—Fish & Richardson P.C.

[57] ABSTRACT

An audio/video transmission system for facilitating transmission of video, hi-fi audio, digital, and control signals (such as infrared remote control signals) between different locations in a residence using existing and active telephone wiring. Simultaneous transmission of signals of each type over active telephone lines is achieved without interference with telephone communications or with the other signal types. Transmission succeeds without requiring special treatment of the video signals beyond RF conversion, despite signal attenuation inherent in transmission over the telephone line media. The fidelity of audio reproduction at the receiving locations is sufficiently high to support the transmission of signals from digital devices without significant loss of audio quality. Multiple video sources and high fidelity audio sources may be tied into the system and selected as desired. Remote control signals generated in one room may be utilized to control video and audio sources in another room without requiring a clear line of sight between the remote control device and the receiver.

38 Claims, 10 Drawing Sheets

U.S. PATENT DOCUMENTS

| | | | |
|---|---|---|---|
| 3,992,589 | 11/1976 | Kuegler | 179/15 FS |
| 4,054,910 | 10/1977 | Chou et al. | 358/86 |
| 4,328,579 | 5/1982 | Hashimoto et al. | 379/93 |
| 4,509,211 | 4/1985 | Robbins | 455/603 |
| 4,546,212 | 10/1985 | Crowder, Sr. | 379/93 |
| 4,608,686 | 8/1986 | Barsellotti | 370/69.1 |
| 4,670,874 | 6/1987 | Sato et al. | 370/110.1 |
| 4,679,227 | 7/1987 | Hughes-Hartogs | 379/98 |
| 4,709,412 | 11/1987 | Seymour et al. | 455/603 |
| 4,766,402 | 8/1988 | Crane | 379/93 |
| 4,785,448 | 11/1988 | Reichert et al. | 370/76 |
| 4,785,472 | 11/1988 | Shapiro | 379/96 |
| 4,829,570 | 5/1989 | Schotz | 381/3 |
| 4,849,811 | 7/1989 | Kleinerman | 358/133 |
| 4,882,747 | 11/1989 | Williams | 379/102 |
| 4,885,803 | 12/1989 | Hermann et al. | 455/603 |
| 4,890,316 | 12/1989 | Walsh | 379/98 |
| 4,893,326 | 1/1990 | Duran et al. | 379/96 |
| 4,949,187 | 8/1990 | Cohen | 348/10 |
| 4,953,160 | 8/1990 | Gupta | 370/76 |
| 4,955,048 | 9/1990 | Iwamura et al. | 379/53 |
| 4,985,892 | 1/1991 | Camarata | 370/123 |
| 5,010,399 | 4/1991 | Goodman et al. | 358/85 |
| 5,089,886 | 2/1992 | Grandmougin | 358/86 |

OTHER PUBLICATIONS

Propp et al., "The AC Powerline As A Communications Medium for DAC Applications," *IDAC*, pp. 17–25, 1990.

Schwartz, "Commtek Intro Video Over UTP," *Communications Week*, p. 5, 1992.

Sheets and Graf, "Build This Carrier Current Audio Transmitter," Radio Electronics, pp. 55–64, 1989.

Sheets and Graf, "Build This Carrier Current Receiver," Radio Electronics, pp. 55–94, 1989.

Waring, "The Asymmetrical Digital Subscriber Line (ADSL): A New Transport Technology for Delivering Wide–band Capabilities to the Residences," *IEEE*, 56(3):1–8, 1991.

"TeleConcepts . . . Introduces the 'Just Plug It In' Intercom System," TeleConcepts brochure, Newington, Ct, 2 pages, undated.

"Remote Extender Owner's Manual," Windmaster Manufacturing brochure, DeFuniak Springs, Fl., 7 pages, Undated.

"Model 4000 Series," Lightwave Systems, Inc. brochure, 6 pages, undated.

"IBM races to the desktop," 1 page, undated.

"Video Transmission System—Send video over ordinary wire—no coax required" Javelin brochure, 2 pages undated.

Tele Video brochure, 2 pages, undated.

Advertisement for a MasterMind universal remote control device, 1989.

(no author), "Instant Network Rides on Phone Lines," Electronic Design, 1987.

Design and Engineering Exhibition Listing.

RF BROADCAST SYSTEM UTILIZING INTERNAL TELEPHONE LINES

This is a continuation of application Ser. No. 08/546,420, filed Oct. 20, 1995, which is a continuation of 08/376,403 filed Jan. 23, 1995, now abandoned, which is a continuation of 08/245,577, filed May 18, 1994, now abandoned, which is a continuation of application Ser. No. 08/114,974, filed Aug. 31, 1993, now abandoned, which is a continuation of application Ser. No. 07/803,196, filed Dec. 5, 1991, now abandoned, which is a continuation-in-part of application Ser. No. 07/688,864, filed Apr. 19, 1991, now abandoned, which is a continuation of application Ser. No. 07/379,751, filed Jul. 14, 1989, now U.S. Pat. No. 5,010,399.

INTRODUCTION

This invention relates to transmitting various signals at radio frequencies across networks of active internal telephone links (that is, telephone wiring which carries telephonic signals within a commercial or residential building) with arbitrary topologies. The disclosures presented herein are partly an outgrowth of ideas and technology disclosed in the parent application, which describes methods for transmitting video signals (i.e., visual and sound signals for televisions and the like) and control signals issued by infra-red transmitters across telephone wiring and is incorporated herein by reference.

More specifically, this invention represents refinements of the transmission techniques disclosed in the parent application to achieve improved results, particularly regarding transmission of audio signals and digital signals across active telephone wiring. These improvements embody methods for communicating the audio and digital signals across active telephone networks that, in addition to carrying voice information from telephone devices, are also in use as a medium for communication of video and control information. The improvements include devices that simultaneously transmit and receive several RF (radio frequency) signals of varying types through a single connection to a network of telephone wiring. The improvements also include a method for cancelling interference caused by certain telephone devices, and various techniques to increase the total number of channels and the distances over which video signals can transmit.

BACKGROUND OF THE INVENTION

The motivation for the transmission of hi-fi audio signals is an outgrowth of the need to transmit the signals from each entertainment source to every corresponding receiver in a building. (Hereinafter, the term "residence" will be used to generally refer to any building that contains telephone wiring, such as an ordinary single-family home, an apartment, or a commercial building.) There is a need, for example, to transmit the signals from video entertainment sources, i.e. video cassette recorders (VCRs), cable converters, and satellite signal receivers, to every video receiver, i.e., each television. A similar need for communication between audio sources and receivers also exists. In audio systems, the sources include cassette decks, record players, compact disc (CD) players, FM tuners, and turntables. The receivers are the loudspeakers and earphones while amplifiers can be classified as part of either category.

In the classical situation, source and receiver are located close to each other in the same room. To enjoy music or video, however, one does not need to be in close proximity to (or even in the same room as) the signal source. Rather, one only needs to be within visual range of the video receiver or audio range of the audio receiver (so as to be able to see or hear the desired signals) and have an ability to control the sources. Thus, an ability to communicate audio, video, and control signals between rooms will allow one to enjoy music and video using only speakers and a television. While the parent application provided a solution to the problem of transmission of video and control signals, no inexpensive solution to the transmission of hi-fi audio, much less the simultaneous transmission of all three signals, has been developed to date.

Hi-fi audio signals can be transmitted across a residence using radio waves as well as by transmission across a wire or other conductive path. Broadcasting signals, however, allows for the possibility of unintended reception outside the residence, and also allows for the possibility of interference from external sources broadcasting at the same frequency. Government regulations covering the broadcast of these signals also present significant obstacles.

Common conductive paths within a residence include power wiring (i.e., wiring that carries 120 VAC, 60 Hz household power), telephone wiring, and coaxial cable. Coaxial cable does not offer a comprehensive solution because it is not available in most residences. It is also bulky, stiff, and unwieldy. Moreover, the signal splitters commonly used in coaxial cabling block transmission between the two downstream ports (i.e., the output ports of the splitters), preventing communication across some of the conductive paths.

Transmission across power wiring is difficult because electrical appliances can impart significant noise onto the wiring network, and because the conductive path is often broken across a fuse box or circuit breaker. Although some systems use power wiring as a conductive path for hi-fi transmission, the systems are relatively expensive, owing to the need for overcoming extremely high noise on the power lines. Even using expensive circuitry, line noise may be so high that it cannot be suppressed in many situations. Moreover, such systems cannot reliably transmit between the differently phased conductors on a 120V residential system, because the conductive paths used by the two phases may only connect far from the residence. Finally, video signals typically cannot be transmitted over power lines with any reasonable degree of quality, so simultaneous transmission of television signals and audio is not possible.

Telephone wiring also presents significant difficulties to the transmission of audio signals. Two obvious difficulties are the requirement of avoiding interference with telephone communications and conforming with all regulations that govern devices that connect to the public telephone network. Other difficulties are presented by the transmission properties of telephone wiring. These include the attenuation of the telephone wiring itself, the attenuation caused by junctions in the wiring and connected telephones that drain RF energy from the network, and switching devices that break conductive paths.

Devices are available that overcome some of these difficulties to achieve transmission of intelligible audio. Radio Shack™, for example, manufactures a telephone that, when used with an identical cooperating telephone, provides intercom communication at frequencies above the voiceband. These phones work over ordinary telephone lines used in residences. In addition to its limitation as a monaural rather than a stereo signal, however, the sound quality produced by this telephone does not approach that of most hi-fi systems. That is, such a system cannot transmit high fidelity sounds between the telephones in a manner that would maintain the high fidelity at the receiving telephone. The same is true for other systems known to transmit audio information across active telephone wiring. None of these systems, moreover, simultaneously transmit video signals or control signals from infrared transmitters.

While transmission of digital signals within a residence is not currently an urgent need, that situation is expected to change rapidly over the next several years. There are currently several systems, designed to be used in office environments, that perform digital transmission over active telephone wires. The catalog of the Black Box Corporation, for example, includes several transmit/receive pairs that perform this function. These devices connect to a digital device to derive a digital datastream that adheres to a particular format, e.g., the IEEE RS-232 standard. This information is converted to a time varying voltage at frequencies above the voiceband of telephones. These signals are then fed to an active telephone wire (i.e., a wire used for voiceband communication) that connects directly from point A to point B without any devices connected in the middle (a so-called "point-to-point" connection). This line typically connects between a telephone and a PBX device. At the end of the line, a receiving device connects to detect the high frequency voltage variations, and convert them back to the original digital datastream.

Because this system transmits data over a point-to-point telephone lines that do not include splits, branches, or telephone devices that are connected in the middle, they may not work over networks with arbitrary topologies and telephone devices connected at random points, features found in the internal telephone wiring of nearly all residences.

SUMMARY OF THE INVENTION

This invention refines the methods described in the parent application to provide transmission of a broader range of video signals over even longer path lengths with still less susceptibility to interference or distortion due to transmission-induced noise. Moreover, the invention allows high-fidelity audio (such as stereo) signals to be derived from a sound system and transmitted across networks of active telephone wiring without significant loss in the signal properties that determine sound quality (i.e., without any substantial degradation in the fidelity of the audio signals). In addition, the invention enables video, audio, and control signals for the video and audio sources to be simultaneously communicated at radio frequencies over active networks of telephone wiring without interfering with each other or with the telephone voice signals or the operation of telephones connected to the wiring. This allows the user to achieve multiple types of communication (video, audio, and control) with only two discrete electronic devices (i.e., the transmitter and receiver pair provided by the invention and discussed below). It also allows the user to export an entire audio/video entertainment system to a second location in a residence by providing that location with a television and speakers.

Accordingly, one general aspect of the invention is a system for communicating video signals between a source and a destination thereof and that includes a transmitter coupled between the source and a first location on a telephone link that carries voice signals from at least one telephone connected to the link (i.e., an active telephone link), and a receiver coupled between a second location on the telephone link and the destination. The transmitter frequency modulates the video signals from the source in a selected frequency band that exceeds frequencies of the voice signals, and couples the frequency modulated signals onto the telephone link. The receiver recovers the frequency modulated signals from the telephone link, demodulates the frequency modulated signals to reproduce the video signals, and applies the reproduced video signals to the destination.

Because frequency modulation (FM) is used, the signal sent over the telephone lines has high immunity to noise and other distortion that are caused by, e.g., the length of the telephone link and splits and other junctions that are typically present on active residential telephone lines. Longer telephone lines between the source (such as a VCR) and the destination (e.g., a television) can be used without degrading television picture and sound quality.

Preferred embodiments include the following features.

The transmitter and receiver each include circuitry (such as filters) for impeding the voice signals on the telephone link from being coupled to the modulation and demodulation circuitry in the transmitter and receiver. This prevents the modulation and demodulation circuitry from "loading down" the voice signals. Likewise, the transmitter and receiver include filters, coupled between the telephone and the telephone link, for impeding the frequency modulated signals from being coupled to the telephone. As a result, the modulated video signals are transmitted over the telephone link with high immunity from telephone loading effects.

A second telephone can be coupled to the telephone link at first location, the second location, or elsewhere on the link. Filtering is used avoid mutual interference between the voice signals and the modulated video signals.

In another general aspect of the invention, the transmitter and receiver communicate audio signals that have a predetermined fidelity level between a source (such as a high fidelity transmitter) and a destination via the active telephone link. The transmitter converts the audio signals to a frequency band that exceeds frequencies of the voice signals in a manner that substantially preserves the predetermined fidelity level and couples the converted signals onto the telephone link. The receiver recovers the converted signals from the telephone link, reconverts them from the frequency band to audio signals in a manner that substantially preserves the predetermined fidelity level, and applies the audio signals to the destination (such as an audio receiver or speakers).

Preferred embodiments include the following features.

The audio signals are converted to the frequency band by modulation (such as FM or AM). Similarly, demodulation is used at the receiver to reproduce the audio signals from the modulated signals received from the telephone link. The source produces the audio signals in a pair of channels and the destination is adapted to receive the audio signals in a like pair of channels (so-called left and right channels). Modulation and demodulation are performed separately (using different modulation frequencies within the band) for each channel. The use of different frequencies for the two channels avoids the channels interfering with each other on the telephone link. The receiver also includes circuitry for controlling the amplitude of the recovered signals in each of the channels.

In another general aspect of the invention, the transmitter and receiver are constructed to exchange several different types of signals, for example, video signals, audio signals, and control signals, over the active telephone link. The transmitter and receiver can exchange all of these signals or any subset thereof.

The transmitter converts the video signals and the audio signals to a different frequency bands that exceed frequencies of said voice signals, and couples the converted video signals and audio signals onto the telephone link. At the receiver, the converted video signals and converted audio signals are recovered from the link, and the video signals and the audio signals are reproduced therefrom, and applied to their respective destination. The receiver also receives the control signals (which are, e.g., radiated from a source such as a hand-held control unit) converts the control signals to yet another frequency band that exceeds frequencies of the voice signals, and couples the converted control signals onto said telephone link for transmission to said transmitter. The transmitter, in turn, recovers the converted control signals from the telephone link, reproduces the original control signals (such as in the form of infrared energy) therefrom, and applies the reproduced control signals to either or both of the video source or the audio source.

Preferred embodiments include the following features.

The transmitter and the receiver each use bandpass filtering to avoid mutual interference between the video signals, the audio signals, the control signals, and the voice signals.

In yet another general aspect of the invention, a television signal that includes an amplitude modulated video component and an accompanying frequency modulated audio component and that is sent by a source thereof over a communication link, possibly with the introduction of noise on the signal, is recovered and applied to a television receiver in a way that substantially reduces noise level. Variations in said amplitude of the audio component of said recovered television signal are measured as an indication of the level of the noise in the video component, and the measured variations are used to reduce the level of noise in the recovered television signal.

This aspect of the invention takes advantage of the fact that the audio component is usually close in frequency to the accompanying video component, and therefore is likely to be similarly affected by noise. Moreover, because the audio component is frequency (rather than amplitude) modulated, the amplitude variations are treated as noise with a high degree of confidence.

Preferred embodiments include the following features.

The audio component is separated (such as by bandpass filtering) from the video component. This is possible because the audio component typically has a carrier frequency that is outside of a frequency band that includes the video component. The amplitude of the audio component is averaged over a selected time period. This average provides an accurate indication of the noise level.

Other features and advantages of the invention will become apparent from the following detailed description, and from the claims.

DETAILED DESCRIPTION OF THE PREFERRED EMBODIMENTS

Figure 1:
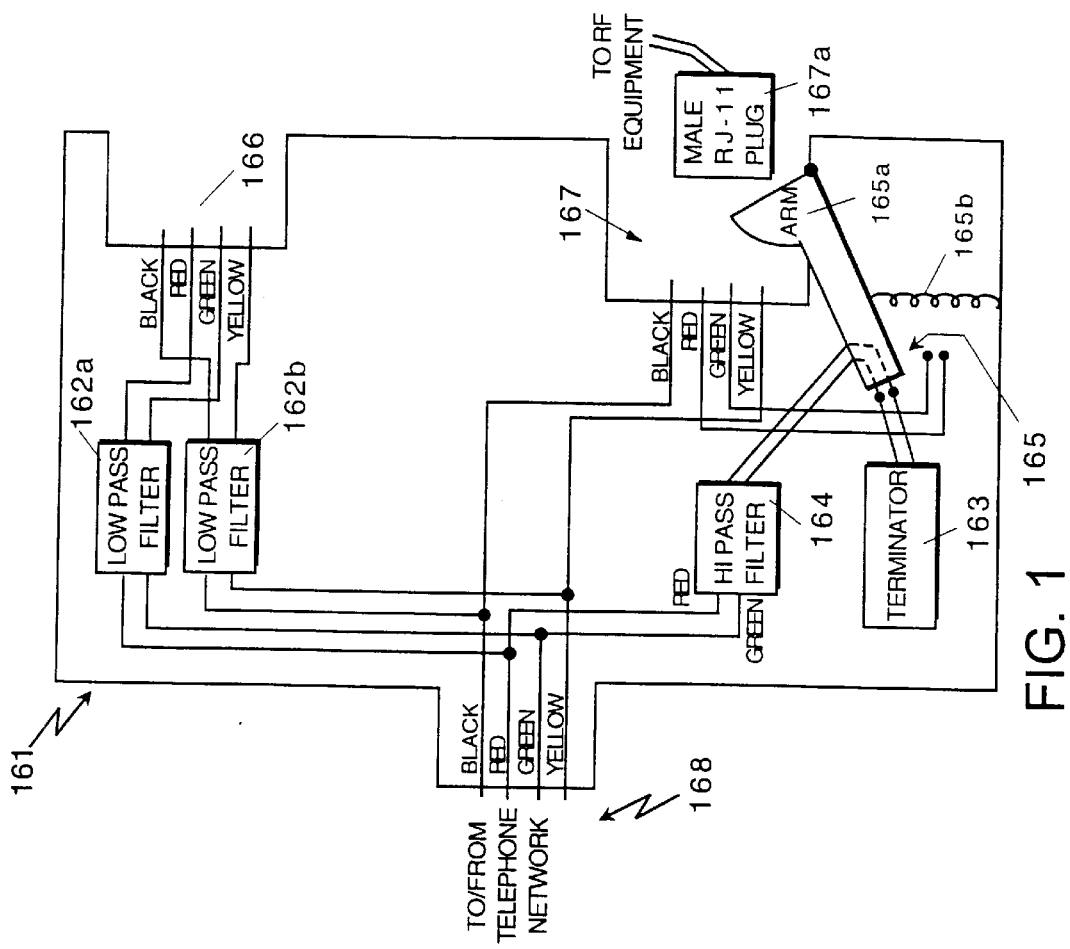
FIGS. 1 and 1A show a signal splitter according to the invention that is useful with the communications systems described herein and, e.g., also in the communications systems described in the parent application.

The devices described herein, and those described in the parent application, feed RF signals onto active telephone links (i.e., telephone wiring that is in use for transmission of ordinary voiceband signals) and recover signals from the telephone wiring. The devices will also function correctly when used over inactive telephone links. Communication of video and infrared control signals in this manner was first described in the parent application. This document describes methods by which hi-fi audio and digital signals are communicated across active telephone wiring as well.

When signals are transmitted over a telephone network, such as the internal telephone wiring of a residence, the signals spread to all parts of the network, and are thus available for recovery by any device that is connected to the telephone wiring. As such, these devices use the wiring as a broadcast medium. They use RF frequencies, and function like wireless communication devices, except that telephone wiring, rather than the airwaves, is the medium.

The devices of this invention are designed to work on any network of telephone wiring in which an uninterrupted two wire conductive path (e.g., the red-green pair in a four conductor cable typically used to carry telephone voice signals) exists between any two points on the network. The telephone wiring need not be "point-to-point" (i.e., splits and other junctions in the telephone wiring may exist between the two points) and loops are allowed. The internal network of telephone wires of nearly all residences fit this description. The only common exceptions are residences where all jacks are directly connected to a central electronic switch/processor, sometimes referred to as a KSU or key-service unit. The parent application (in connection with FIG. 5) describes an adapter that provides an RF bypass around such a switch, allowing transmission of video and control signals to all points of the telephone wiring. The same adapter can be used to allow other RF signals, including the signals described herein, to bypass the switch and broadcast across the telephone network. Such an adapter can also be used to repair breaks in the conductive paths of other types of telephone wiring networks.

The parent application describes a pair of transceivers which exchanges video and infrared signals over the active telephone wiring. The first transceiver transmits video signals to and receives infrared control signals from the second transceiver, and, of course, the second transceiver does the opposite. The first transceiver is referred to therein as the "video source transceiver" because it connected to a video source (such as a VCR). The second transceiver is called the "television transceiver" because it ordinarily is connected to a television.

In this document, devices that transmit video signals over an active telephone network are referred to as "video transmitters," even though they may send or receive signals of other types (such as purely audio signals, digital signals, etc.). Devices that receive video signals from active telephone wiring are denoted as "video receivers". Devices that both transmit video signals to and receive video signals from a telephone network are referred to as "video transceivers".

Increasing the Number of Channels and the Distance Over Which RF Signals Can Transmit on Telephone Wiring Using the techniques disclosed in the parent application, a full cable band spanning sixty video channels can be fed to a one foot length of telephone wiring and transmitted with high quality without violating any FCC regulations. As the distance between transmitter and receiver increases, however, factors come into play which cause higher frequency signals to drop out. The same phenomenon occurs with RF signals of other types. Thus, transmission length and the total number of available channels are closely related quantities. In this section, several techniques are disclosed to extend the limits to these quantities.

The following equation governs whether transmission of an RF signal across telephone wiring can succeed:

$$SL-TL-PA>SNR+IL \qquad \text{(equation \#1)}$$

where,

SL=Source level (dBmV),

TL=Transmission loss (dB),

PA=Point attenuation (dB),

SNR=Signal to noise ratio (dB), and

IL=Interference level (dBmV).

That is, high-quality video signals will be received if source signal level, less transmission loss, less point attenuation, exceeds the minimum required SNR by the amount of the interference. Each of these components is now discussed in the context of transmission across telephone wiring.

1) Signal level (SL). Generally, the technology required to amplify a video signal to the levels of interest in the systems disclosed in this application is simple and inexpensive. The real limits to signal level are dictated by legal (e.g., FCC) restrictions on the signal energy radiated from the wire. In experiments described in the parent application, NTSC signals with a picture carrier at 61.25 Mhz applied to four conductor telephone wiring at 40 dBmV slightly exceeded U.S. FCC regulations. Radiation caused by a signal at a fixed energy level increases as the frequency of that signal increases.

2) Transmission loss (TL). This is the signal energy lost by transmission across the wiring. This quantity is linearly related to the length of the wiring and increases significantly as frequency increases. At 100 Mhz, for example, typical telephone wiring attenuates energy at approximately 15 dB per 100 feet, while at 175 MHz, attenuation is approximately 30 dB per 100 feet.

3) Point Attenuation (PA). This quantity refers to the signal energy lost at a single point on the conductive path. Examples are the attenuation of RF energy by telephones, by "open" telephone wall jacks (i.e., jacks which are not connected to a telephone), and the loss at splits in the wiring. The loss at a split is approximately 3.5 dB. The loss at an open jack is smaller (less than 3.5 dB) because most of the energy is reflected back onto the line. Telephones can have a much higher attenuation affect than either an open jack or a split.

4) SNR. This is the minimum SNR required at the receiver input to generate a good picture and is largely a function of how the signal is encoded and how picture quality is measured.

5) Interference level (IL). This is the energy level of the interfering signals found on the wiring. Some examples are signals from citizens' band (CB) radios and amateur radio signals that might be picked up by the wiring acting like an antenna. (The ability of the wiring to act as an receiving antenna increases with frequency, as does the radiating ability of the wiring.) Another interference source is the non-linear effects of certain telephones on RF signals. This is described in the section that immediately follows. Still another source of interference is the energy that crosses over from a second RF signal at the same frequency on a second pair of telephone wires in the same wire bundle. (As is known, a typical residential telephone wire bundle or cable includes two pairs of wires: a red-green pair, which is normally used for the primary line in residential telephone hook-ups, and a black-yellow pair, typically unused unless the residence is equipped with a second telephone line. In structures other than residences, large bundles are used that consist of many pairs of telephone wires.) This phenomenon is known as crosstalk and increases with increasing frequency.

It is interesting to note that transmission loss, radiation, interference, and crosstalk all increase with frequency, making the use of lower frequencies to transmit video, audio, or digital signals over the telephone lines according to the invention much more attractive.

To summarize some of the transmission properties discussed above, it is seen that increasing SL, decreasing TL, decreasing PA, decreasing minimum SNR, and decreasing IL will allow an RF signal at a fixed energy level to transmit over longer distances on a given network of wiring. Equivalently, given a fixed transmission path and a fixed signal energy, those changes to SL, TL, PA, IL, and minimum SNR allow video to transmit at higher frequencies. In the following five sections, methods to improve transmission via changes in PA, minimum SNR, and IL are disclosed.

Figure 1A:
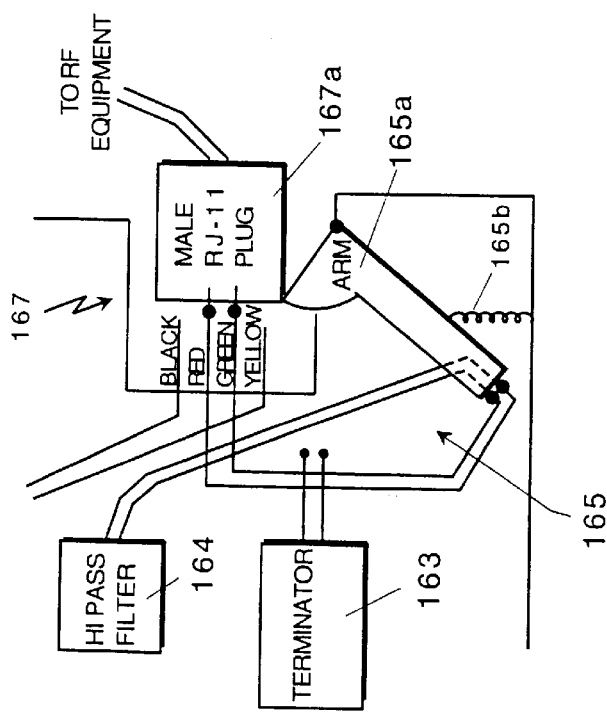

Decreasing Attenuation by Connected Telephone Devices (FIGS. 1, 1A)

Many telephone devices load down RF energy on the telephone line. This attenuation can occur in both the on-hook and off-hook conditions. As described in the parent application, when connected to a telephone network across which RF signals are transmitted, telephone devices can drain RF signal energy, lowering the level of the RF signal at the receiver. Given the attenuation properties of a specific telephone device, the degree of reduction of the RF energy level at the receiver depends upon the location at which the telephone device is connected to the telephone network.

When applied by a source (e.g., the video source transceiver) to the telephone wiring using the techniques described in the parent application, RF energy is transmitted between the source and receiver (e.g., the television transceiver) over one or more conductive paths, that is, one or more branches of the telephone wiring. The shortest path is usually dominant, i.e., more energy arrives at the receiver by traversing the shortest path than by traversing any other. This is because energy attenuation is directly related to path length. One situation where the shortest path does not dominate is when it includes many junctions (such as branches that connect to secondary jacks), or splits. In this case, a longer path may be the dominant path. Another exception is where many telephone devices connect to the shortest path, attenuating the energy level below that of another path.

According to theory, there is a rough inverse relationship between the amount of RF energy drained by a telephone device and the distance of that device from the dominant transmission path. As described in the parent application, physically long branches will serve to reduce the attenuation effect of a connected telephone device. The attenuation introduced by telephone devices connected through relatively long branches will be limited by the 3.5 dB splitting loss that long branches impose at a junction. If, on the other hand, the telephone device is connected to the dominant path through a branch that is not long enough to impose significant attenuation (e.g. less than 1 dB), the effective reduction of energy from the path can approach the full dissipative effect of the telephone device.

As mentioned in the parent application, if a telephone device is connected to the dominant path through a low-pass filter, it cannot significantly drain RF energy from that path. It is suggested therein that low pass filters be supplied with both the transmitter and receiver so that telephone devices sharing the same telephone jacks as the transmitter and receiver do not load down the video signals. Because they necessarily connect to the dominant path, these devices are considered to be the most likely to cause signal attenuation.

Referring to FIGS. 1 and 1A, experiments conducted by the inventors have since indicated that in many residences, providing all telephones with low pass filters decreases attenuation sufficiently to significantly increase the number of channels over which transmission can succeed. Such a procedure is feasible because simple, inexpensive low-pass filters can be enclosed in a compact housing which serves as a splitter 161 and includes standard RJ-11 telephone connectors 166, 167, 168 for providing connections to the telephone network, the telephone devices, and the video transmitter or receiver.

Splitter 161 includes a network port 168 that includes a male RJ-11 plug which is simply inserted into an existing RJ-11 outlet of the telephone network (not shown), replacing the single outlet with two alternative outlets, both of which are female RJ-11 connectors. One of the alternative outlets is a phone port 166 to which a telephone plug is connected. Within splitter 161, phone port 166 is connected to network port 168 through a pair of low-pass filters 162a, 162b. Low pass filter 162a filters signals present on the red-green wire pair, and signals on the black-yellow pair are applied to filter 162b.

Devices that transmit and receive RF signals are connected to splitter 161 at RF port 167. These devices include, of course, the video transmitters and receivers described in the parent application, as well as any of the transmitters and receivers described herein. The black-yellow wire pair is directly connected between RF port 167 and network port 168. A high-pass filter 164, double-pole-double-throw switch 165, and terminator 163 are connected as shown to the red-green pair between RF port 167 and network port 168 for purposes described in detail in the following section.

Low pass filters 162a, 162b also suppress the transients from telephone switch-hook signals. These transients can include significant energy at higher frequencies. To suppress substantially all transients, however, an additional low-pass filter should be placed along the path that connects the telephone wiring of the residence to the public telephone network. In a typical residence, this means placing the low-pass filter at the point where the telephone company wire enters the residence. This will suppress substantially all high frequency energy that originates at the public exchange.

Although it is unlikely that the public exchange will provide significant high frequency energy, this filter also serves the purpose of blocking the high frequency energy transmitting on the residential wiring from creating a violation of governmental regulations by conducting onto the public telephone system. For example, Part 68 of the U.S. FCC regulations places severe limits on the amount of energy that can conduct onto the public networks below 6 Mhz.

Figure 2:
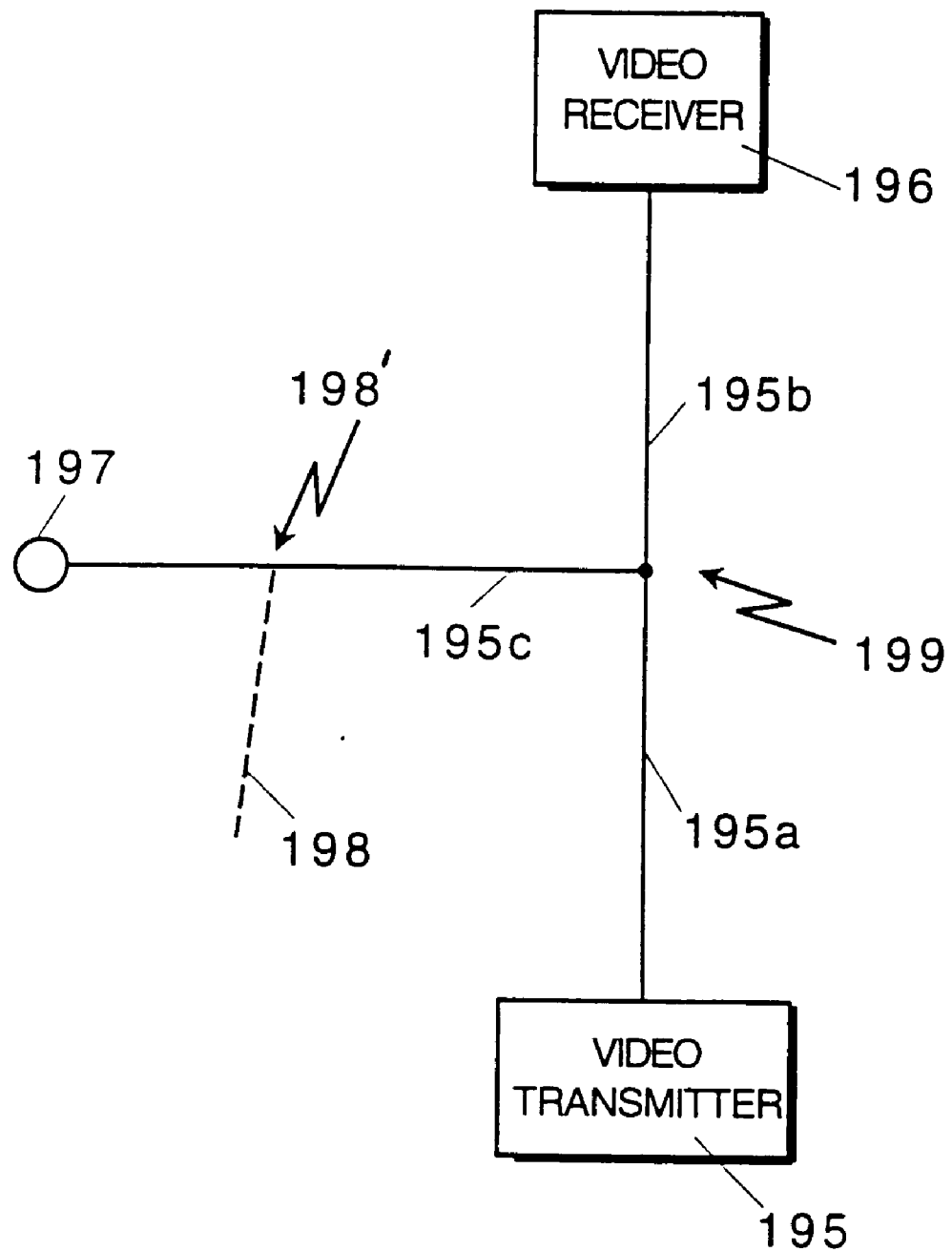
FIG. 2 illustrates certain properties of transmission of RF signals.

Reducing the Likelihood of Interference from Multipath Transmissions (FIGS. 1, 1A, 2)

The parent application describes a series of tests involving transmission of television video signals across wiring of an internal residential telephone network to a television for viewing. One purpose of the tests was to determine if a type of interference called "ghosting" or "multipath" would appear in the image displayed on the television screen.

Multipath interference is caused by reception of the video signal of similar energy levels from multiple transmission paths. The classic example of multipath interference with video is when a signal transmits from an antenna to a television via two different paths. The dominant path is the one that extends directly from the antenna to the TV. The secondary path reflects off a nearby building before arriving at the television.

The possibility of multipath interference with signals transmitting over telephone networks is present because of the many paths that signals can follow between source and receiver. This interference, however, was not observed in any of the tests performed. A brief explanation of its absence was included in the parent application. In the following paragraphs, the issue of multipath interference is discussed in greater detail, and a technique to eliminate it in situations where it may occur is described.

As mentioned above, multipath interference can occur when a video signal is transmitted between the video signal source and receiver over paths of different lengths. The signal whose energy at the receiver is highest has usually traversed the most direct path. If a reflected signal is received at a level comparable to the signal provided by the direct path, multipath interference is created in the form of a duplicated image that is offset horizontally on the television screen vis-a-vis the first. An example of multipath interference in the case of transmission over airwaves is where a second path reflects off of a nearby building before reaching the receiver.

Referring to FIG. 2, reflections can also take place on a network of telephone wiring. The most common points of reflection are where the wiring splits, and where a branch of wiring terminates at an open jack. Both of these types of reflections are shown in FIG. 2, which illustrates a portion of a telephone wiring network that includes a video transmitter 195 that transmits a video signal across branches 195a, 195b of the wiring to a video receiver 196. Branch 195c joins branches 195a, 195b at split 199. If branch 195c is short relative to one quarter of the wavelength of the signal (e.g. less than 10 meters at 30 Mhz) and is not connected to any telephone devices, theory dictates that its effect on the signal transmitting to receiver 196 will be minimal. (If branch 195c is short and is terminated with a telephone device, attenuation occurs as described above.) If the length of branch 195c is comparable to or larger than a quarter of a wavelength, however, a portion of the video signal will be reflected, at split 199, back to transmitter 195 with a 5 dB loss; the remainder of the video signal will be divided between branch 195b (leading to receiver 196) and branch 195c (which connects to termination 197). The signal level on each path 195b, 195c will be 3.5 dB below the level of the video signal incident at split 199 from transmitter 195.

If termination 197 is simply an open telephone jack, theory dictates that termination 197 will induce a phase shift and a small energy loss in the video signal on branch 195c which will then be reflected back towards split 199. At split 199, part of the energy in the reflected signal will again be reflected, this time back to termination 197, with a 5 dB loss, part will be transmitted to transmitter 195 with a 3.5 dB loss, and part will be transmitted towards receiver 196, also with a 3.5 dB loss. This last component, the energy transmitting towards receiver 196, will represent the reflection with the highest level. It will have twice suffered a 3.5 dB loss at split 199, a reflection loss (induced by termination 197), and also the extra attenuation of traversing branch 195c two times. The original video signal from source 195, on the other hand, will have suffered only a single 3.5 dB loss at split 199.

The amount of offset between the video signal that reaches receiver 196 through reflections in branch 195c and the video signal that is applied to receiver 196 directly from source 195 (i.e. through branch 195a, split 199, and branch 195b) is related to the time delay between reception of the direct and the reflected signal. The following analysis of television dynamics reveals how much delay is necessary to create visible interference.

The horizontal sweep rate of an NTSC television is 15,750 scans, or lines per second. If there are 300 pixels of resolution per line, $2.1 \times 10^{-7}$ seconds elapse for each pixel. At a transmission speed of $3 \times 10^8$ meters per second, this means that the reflected path must be approximately 120 meters longer than the direct path to cause a two pixel offset. Transmission speed over telephone wiring will be somewhat less, perhaps around $2 \times 10^8$ meters per second, meaning that a direct-to-reflected path length differential of approximately 80 meters will cause a two pixel offset.

For the reflected signal to cause interference, it must be delayed long enough to cause significant offset while retaining enough of its energy to have a visible effect on the television picture. If two pixels are considered to be the minimum noticeable offset, then the above computations indicate that the delay caused by a 80 meter or 250 feet detour will cause a two pixel offset. This can be caused by a branch 125 feet long.

At 30 MHz, attenuation of telephone wiring is approximately 7 dB per one hundred feet. At that rate, the reflected path will suffer a 17.5 dB loss over a 250 foot detour. As a result, if branch 195c is 125 feet, the energy of the reflected signal in FIG. 2 will be at least 21 dB (17.5 dB due to the detour plus 3.5 dB contributed by split 199) below the energy video signal that follows the direct path of branches 195a, 195b. The reflection loss at termination 197 may make the reflected signal level slightly lower. Because interference suppressed as much as 40 dB can still affect an AM (amplitude modulated) video signal, the reflected signal would cause multipath interference if the transmitted signal is AM encoded.

Splits and connected telephone devices encountered along a detour, however, can prevent multipath interference from occurring. Because it is unusual to find a "clean" 125 foot branch with no splits or telephone devices, this is an important property. The mechanism by which splits and connected telephone devices can prevent multipath interference is explained in the following paragraphs.

The routing and attenuation of reflected signal energy is very different if the dashed line labeled sub-branch 198 represents a secondary branch connected to branch 195c, whose length is comparable to or larger than a quarter of a wavelength. In this event, the split 198' created by sub-branch 198 causes the reflected signal analyzed above to lose 3.5 dB while passing from split 199 to termination 197, and another 3.5 dB while returning from termination 197 after the reflection. Although the lost energy stays on the network in the form of reflected signals that will ultimately find their way back to receiver 196, these "secondary" reflections will have different delays or offsets. This means that their energy will not add coherently and the combined effect of the various reflected signals will be dominated by the effect of the strongest reflected signal. Termination 197, moreover, may include a connected telephone device which can further attenuate the reflected signal.

Because 125 foot branches with no significant secondary branches and no connected telephones are unusual, multipath interference is not likely at 30 MHz or above. At 10 MHz, however, the attenuation of telephone wiring is approximately 2.5 dB per 100 ft. The loss due to attenuation in this case is only 6 dB. This means the energy differential between reflected and direct signals is less at 10 MHz than at 30 MHz, making multipath effects more likely at the lower frequency.

To avoid multipath interference, the following solution, embodied in splitter 161 (FIGS. 1 and 1A), is disclosed. Reflections at the termination (i.e., a telephone jack) of a long branch are suppressed by altering the impedance of the termination to match that of the wiring at the frequencies of transmission. Video signals incident at such a termination will not reflect but will behave as if the conductive path continues without end. Thus, video signals and other energy presenting at this termination will be removed from the wiring network.

In some circumstances, the removal of energy by these terminations can have a detrimental effect. Consider, for example, the case where a main transmission path has 10 short stubs connected to it, each of which provides a port for connection of telephones. Terminating each of these in this manner would remove 3.5 dB of energy at each stub, a total reduction of 35 dB. Because the ports are connected via short stubs, furthermore, they are not likely to cause multipath problems. Thus, termination of the stubs would be unwise in this case. (Use of low-pass filters to prevent draining of high frequency energy by connected telephones, however, is still very useful.)

In general, branches should be terminated only when multipath interference would otherwise result from a reflected signal. In the case of AM video, interference only occurs when a signal traverses a reflected path longer than approximately 200 feet, and is received at a level within 40 dB of the level of the strongest signal.

FIGS. 1 and 1A show a method of altering the termination of a telephone jack at frequencies above voiceband. Video signals (i.e., RF signals as produced by, e.g., any of the transmitters disclosed herein) incident at network port 168 on the red-green wire pair are applied equally to (i.e., split between) low-pass filter 162a and high-pass filter 164. The RF signals pass through filter 164 to switch 165, shown in its normally closed position in FIG. 1. Switch 165 is actuated by arm 165a, the position of which is a function of whether a RF receiver (such as any of the receivers described in the parent application or elsewhere in this application) is connected to RF port 167 or, alternatively, whether RF port 167 is "open."

Arm 165a is pivotally mounted at RF port 167 and biased by spring 165b to maintain switch 165a in the normally closed position whenever RF port 168 is "open" (i.e., does not have a telephone plug 167a inserted therein). As a result, if RF port 167 is open, the RF signals from high-pass filter 164 (which is, for example, a single capacitor inserted in series on the red or green wires) pass through switch 165 to terminator 163. Terminator 163 absorbs all of the RF energy transmitting from the network to port 167, allowing no reflection. This can be achieved with a simple resistor (such as approximately 100 ohms) that matches the impedance of the telephone line and connects from the red to the green wires.

When telephone plug 167a is inserted into port 167 (as shown in FIG. 1A), plug 167a pivots arm 165a downward, compressing spring 167b and changing the position of switch 165 to couple the RF signals between high pass filter 164 to RF port 167, bypassing terminator 163.

Frequency Modulation to Decrease Minimum SNR and Reduce Distortion

In the general procedure described in the parent application, video signals are converted to RF bands before being fed to the telephone wiring. Some of the specific conversion techniques described include the modulation of a basebanded video signal to an AM channel tunable by ordinary televisions.

Amplitude modulation (AM) has the advantage of being relatively inexpensive and narrow in bandwidth. Its drawback is that a high SNR is required for good picture quality. For NTSC signals modulated with a one-sided bandwidth of 4 Mhz, an SNR of at least 40 dB is required. (The one-sided bandwidth is defined as being the distance from the picture carrier to one end of the band.)

Modulating video signals using frequency modulation (FM) can alleviate the problems of high SNR requirements because the FM reception process is generally more sensitive than AM reception. This advantage follows from the fact that the SNR at the output of an FM receiver is generally higher than the SNR at its input. In other words, the "signal-to-noise" in FM is higher than the "carrier-to-noise." (In AM, by contrast, the "signal-to-noise" is equal to the "carrier-to-noise.")

The improvement in minimum SNR depends on the nature of the noise, the nature of the reception and demodulation process and, in particular, the bandwidth of the signal. All other factors being equal, an improvement in minimum SNR will always accompany an increase in FM bandwidth. One example of the relationship of bandwidth to the SNR improvement is the VFMS-2000 system, an FM video modulate/demodulate pair built by CATEL Corporation. This pair uses 14 Mhz of bandwidth and provides an SNR improvement of approximately 10 dB over AM communication.

FM video signals with bandwidths wider than 20 Mhz are used in communication with satellites, resulting in advantages in sensitivity greater than 10 dB. As the modulation index and thus the bandwidth increases, however, higher frequencies are required, causing increased attenuation at the high end of the signal, possibly cancelling the extra advantages. Nevertheless, use of very wideband FM signals in transmission of video signals in the applications addressed herein holds the promise of significantly increasing transmission length.

The power of FM signals to reject interference increases when the interfering signal is a second FM signal confined within the same channel. The minimum energy advantage that a receiver requires to reject a weaker but otherwise equivalent signal in the same channel is known as the "capture ratio", and is often significantly less than the minimum SNR necessary to avoid distortion by white noise. The exact capture ratio will depend on several factors, but the inventors estimate that the capture ratio of an FM NTSC video signal with a 15 Mhz bandwidth will typically be less than 10 dB, allowing it to ignore interfering FM signals whose levels are suppressed by at least 10 dB.

Another advantage of frequency modulation is that it makes the signal less susceptible to spectral tilt. Spectral tilt, which is described in the parent application, occurs when the signal energy at one end of a signal spectrum is out of proportion to the energy at the opposite end. When the difference is large it can cause distortion of amplitude modulated (AM) signals because information is carried in the amplitude variations of the signal. Frequency modulated signals, by contrast, are relatively immune to spectral tilt because their information is encoded in frequency variations.

Spectral tilt often occurs during transmission because the attenuation (per unit length) of the medium increases at the high end of the spectrum. The problem increases as transmission length increases. Wideband AM signals, such as standard NTSC video signals, are especially susceptible because the difference in transmission attenuation between the high and low ends of their spectrum is likely to be more pronounced. By contrast, narrowband (such as audio) AM signals rarely encounter this type of distortion.

In the case of standard amplitude modulated NTSC video signals, the information in the lower half of the frequency band of the signal is redundant and is ignored by receivers. Thus, the difference between the signal level at the picture carrier frequency and the signal level at the upper end of the band (which is 4 Mhz above the carrier) determines whether interference due to spectral tilt is likely to occur.

Compensation for spectral tilt can be implemented at the receive end of the transmission path by boosting the level of the higher frequencies by the amount of extra attenuation that they experienced during transmission. The extra attenuation can be estimated, and the compensation "fined tuned" in response to that estimate. This is called equalization, and requires additional processing which raises costs and adds complexity. Alternatively, the higher frequencies of the signal can be amplified commensurately with the extra attenuation expected during transmission. This is called pre-emphasis and increases cost for the same reasons. If adjustable pre-emphasis or equalization circuitry is provided, the amount of compensation can be "fine tuned" in response to the observed quality of transmission.

Inspection of the relationship between signal frequency and the attenuation of signals by telephone wiring reveals the frequency bands in which the difference in the rate of attenuation between the two ends of a 4 Mhz band is significant. The attenuation of signals transmitting on telephone wiring at 61.25 Mhz, for example, is approximately 11 dB per 100 feet. At 65.25 Mhz, the rate is approximately 11.66 dB per 100 feet. Thus, the low end of an NTSC video signal transmitting at VHF channel 3 (which spans between 60 and 66 Mhz) will gain a 0.66 dB advantage over the high end for every 100 feet of path length. Similar analysis shows that the differential across any 4 Mhz channel is approximately the same for 4 Mhz bands whose low end exceeds 5 Mhz. (E.g., attenuation at 20 Mhz is 0.66 dB less per 100 feet than attenuation at 24 Mhz.) This is not generally true for frequency bands whose low ends are below 5 Mhz. This means that spectral tilt is not an important factor when comparing two bands whose low ends are both above 5 Mhz.

When the ratio of the upper frequency limit to the lower frequency limit of a transmission channel is very large, spectral tilt can cause interference to FM signals if two signals within the same frequency band (channel) transmit on neighboring twisted pairs in a bundle. This problem, and a proposed solution, is described below in the section that addresses the transmission of signals on tightly bundled twisted pairs.

Another advantage of frequency modulation is that it eliminates another form of distortion related to the varying attenuation caused by connected telephones. That type of distortion is described later on in this application.

One drawback of frequency modulation is that it complicates the design of the video receiver. Specifically, RF converter 19 in FIG. 2 of the parent application must convert the waveform of the video signal in addition to converting the signal to a different frequency band. This is because most televisions can only receive AM signals. One preferred method is to detect the FM signal, thereby providing a signal in the baseband frequency range. The basebanded signal is then amplitude modulated to a tunable channel.

Transmission at Empty VHF and UHF Channels to Reduce Interference

One method of reducing interference is to transmit the video signals within bands that are allocated by the FCC for television transmission but are not being used in the local area. Because the bands allocated for video are always off-limits to other types of sources, this assures the absence of any broadcast interference. This assures that the IF component in governing equation #1, above, is always a minimum. This makes transmission at these frequencies more reliable from the standpoint that there is no danger that the IF component will have a dramatic and sudden increase due to a nearby broadcast source.

For example, frequencies below 30 Mhz are susceptible to interference from a nearby amateur radio (HAM) transmitter operating in the 10, 15, 20, and 30 meter bands. The probability of such interference is small because the broadcasting antenna must be very close. Where there is no tolerance for such interference, however, the unused television channels are more favorable than the frequencies below 30 Mhz, despite the increased transmission path length.

In the parent application, reference is made to the use of empty video channels below VHF channel 7. Channels at VHF 7 and above were not considered good candidates because of the extra radiation that would accompany their higher frequencies. By using frequency modulation or by installing low-pass filters at each telephone (such as by using splitter 161 above), however, the length over which signals at higher frequencies can transmit is significantly increased. Because only two low VHF channels, VHF 3 and VHF 6, are empty in, among others cities, Los Angeles, New York, Chicago, Detroit, and Boston, these high VHF empty channels can be important.

In AM transmission, the signal bandwidth and channel separation match the standard NTSC 6 Mhz channel system, so an AM signal can fit into any unused VHF or UHF television channel. FM transmission, by contrast, loses much of its advantage in minimum SNR when its bandwidth is confined within a 6 Mhz channel. Thus, consecutive empty channels must be used for FM. Unfortunately, many large cities do not have consecutive empty channels in the VHF band. In New York City, for example, only channels 3, 6, 8, 10, and 12 are unused.

Many consecutive unused channels exist, however, in the UHF band, allowing one to find enough bandwidth to accommodate an FM signal. Although the wire attenuation is higher at UHF frequencies, and radiation from the wire is also higher, if the telephone attenuation is significantly reduced (e.g., by using low-pass filters at each telephone) and the low minimum SNR advantage of FM is exploited, transmission at these channels over the internal residential telephone network may well be commercially feasible.

Figure 3:
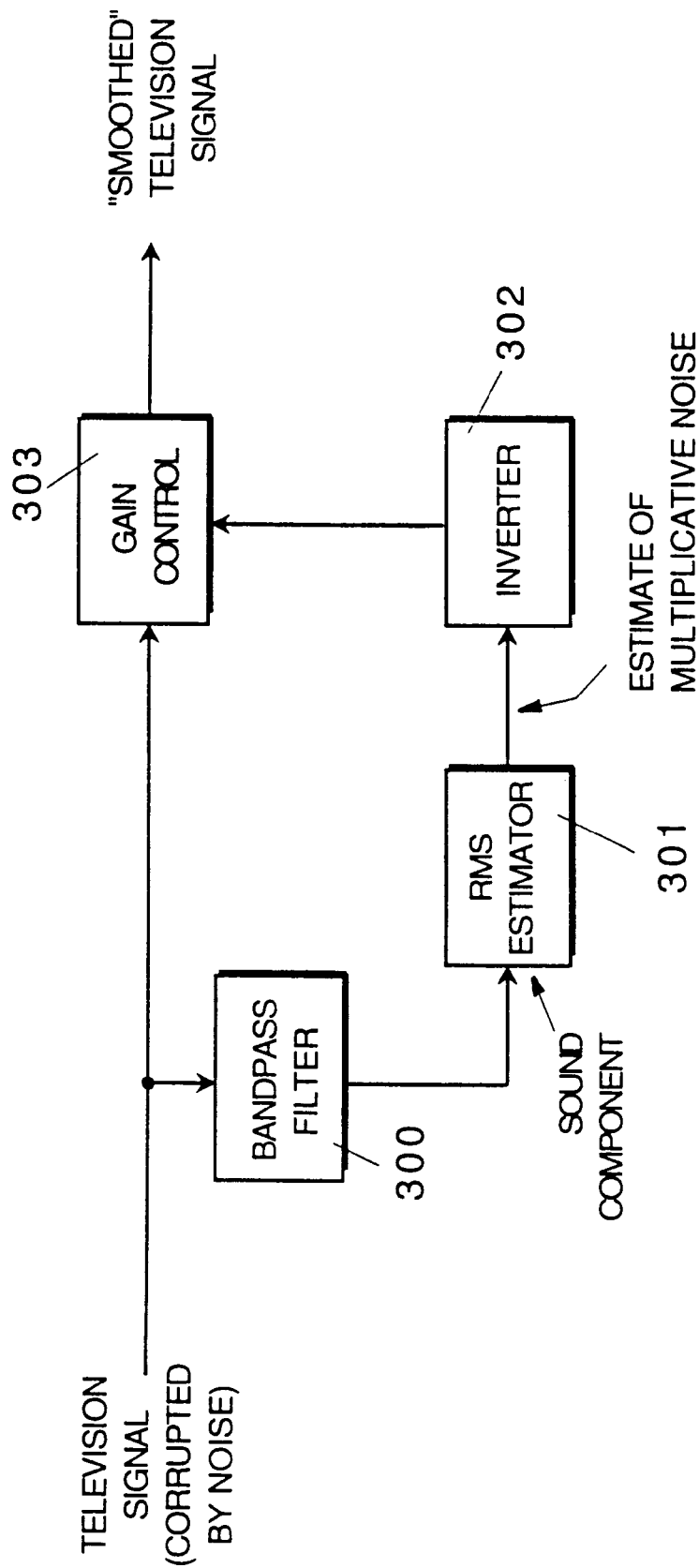
FIG. 3 is a block diagram of an automatic gain control (AGC) technique according to the invention.

Eliminating Disturbance of RF Video Signals Caused by Voiceband Energy (FIG. 3)

The inventors have determined that, in addition to the attenuative effects of some telephones connected near the dominant path, certain telephones would occasionally disturb the television picture when voiceband signals were present on the telephone line. The inventors did not correlate this interference with any particular class or category of telephone device.

In approximately one third of the residences tested by the inventors, a disturbance in the displayed picture was observed when any ordinary voiceband signal such as a typical telephone conversation, a dial tone, touch tone, or rotary dial signal, was present. The interference was also noticed when a ring signal was applied to the telephone. Generally, if a voiceband signal caused a disturbance, the ring signal did as well. Conversely, if voiceband signals did not cause a disturbance, ringing signals also did not.

The inventors traced the problem to one or more of the telephone devices connected to the network. Some of these devices only caused their disturbance when off-hook, some only when on-hook, some in either condition. The problems only occurred when these devices were connected close to the dominant path—as the distance to the dominant path increased, the interference always lessened. (When a video signal with a 25 MHz carrier was transmitting, telephones ceased to cause a disturbance when removed 60 ft from the dominant path.) When a low-pass filter was interposed between the telephone and the wiring as described above, the disturbance disappeared completely.

Evidence indicated that variations in attenuation of RF energy by such telephone devices closely tracks the variations in the time-varying voltage that represents the voiceband signals. This varying attenuation causes a rapidly varying video signal level at the video receiver. If the telephone device that induces the varying attenuation is connected close to the dominant path and the variations are large, the interference will be significant. As is seen from the discussion above, amplitude modulated signals are much more likely to be affected by this interference than frequency modulated signals.

One method of substantially eliminating this problem in a given residence is to install low-pass filters on every telephone. This was suggested earlier to expand the number of transmission channels. It is certainly feasible when installation of a video transmission system is performed professionally. It may not be practical, however, to require an ordinary consumer to perform this installation.

An alternative solution is to install an automatic gain control (AGC) circuit in the RF device that receives the video signal (e.g., the television transceiver shown in FIG. 2 of the parent application). The AGC circuit smooths out the variations in video signal level caused by offending telephones before presenting that signal to the television. A description of a circuit that can perform this function is given below.

Let the attenuation of the offending telephone be represented by the following equation (#2):

$$C + Bi(t)$$

where C represents the constant component of the attenuation and $Bi(t)$ represents the time varying portion of the attenuation. B is a constant and represents the magnitude of the variations, and i(t) is zero mean, unit power and represents the variation with time.

Now let the video component of the television signal at the receiver when the telephone is disconnected be denoted by Vv(t), where V is a constant and v(t) has a peak of unity and zero mean. The received signal when the phone connects is thus:

$$[C+Bi(t)]Vv(t) \qquad \text{equation (\#3)}$$

or $$CVv(t)+VB[i(t)v(t)] \qquad \text{equation (\#4)}$$

or $$[1+(B/C)i(t)]CVv(t) \qquad \text{equation (\#5)}$$

The first term in equation #4 represents the video signal and the second term represents the noise.

Note that the quantity [C+Bi(t)] in equation #3 (and the mathematically identical quantity [1+(B/C)i(t)]C in equation #5) multiplies the pure video signal Vv(t). Thus, this quantity represents what can be called "multiplicative noise." This quantity is time varying due to the process i(t), described herein. This quantity is also known as the "envelope." By smoothing out this variation, i.e. by using an AGC (automatic gain control) circuit in the receiver to apply a time varying gain equal to the inverse of this quantity, the noise can be canceled and only the signal, v(t), will remain.

Applying AGC techniques to AM video, unfortunately, presents an additional difficulty. The difficulty lies in the fact that amplitude variations due to interference are not easily distinguishable from variations that represent the modulated signal. The solution disclosed herein (and shown in FIG. 3) measures variations in the amplitude of the sound component of the video signal to estimate the behavior of the interfering signal. This is possible because the sound carrier is frequency modulated, meaning that variations in its amplitude do not represent signal information, only interference. This interference, furthermore, will be very similar to the signal interfering with the video component. That is because the video and sound components are relatively close in frequency. (The picture carrier in a NTSC signal is separated from the sound carrier by only 4.5 MHz.) It follows that the interference measured in this manner can be used to compensate for the corruption of the video component. This procedure is described below.

Let Ss(t) represent the sound component of the television signals, where s is constant. Because this signal is frequency modulated, the quantity s(t) is a sinusoid with time varying frequency. If that sinusoid is assigned an amplitude of 1, S becomes the amplitude of the signal.

When Ss(t) replaces Vv(t) in equation 5, the resulting expression, [1+(B/C)i(t)]CSs(t), represents the disturbed sound signal. Furthermore, [1+(B/C)i(t)]CS can be viewed as the time varying amplitude of the sinusoid s(t), because i(t) varies much more slowly (it varies at voiceband frequencies) than s(t). Because the inverse of the quantity k[1+(B/C)i(t)]CS (where k is a multiplicative constant) when multiplied by the video signal [1+(B/C)i(t)]CVv(t) leaves the pure video signal (k/S)Vv(t), if k[1+(B/C)i(t)]CS can be estimated, the video interference can be canceled.

An estimate of the time varying amplitude of the sound signal, [1+(B/C)i(t)]CS, is computed by computing the RMS of that signal over an averaging time long enough to smooth out variations in s(t), but short enough to preserve variations of i(t). Thus, the lower bound of the averaging time will be the inverse of the highest frequency of v(t), i.e. a value in the microsecond range. An upper bound will be the inverse of the maximum frequency of the baseband signal i(t). This value will be in the millisecond range because i(t) is in the telephone voiceband. An estimate of [1+(B/C)i(t)]CS will be 0.707 times the computed RMS.

FIG. 3 shows a block diagram that illustrates the estimation process. This process can be employed in, e.g., television transceiver 15 of FIG. 2 in the parent application. A television signal is split and fed to bandpass filter 300 and gain control 303. The filter attenuates the video component, leaving only the sound component, which is fed to RMS circuitry 301. That component estimates the RMS of the sound signal over an averaging period that is set according to the above description. As described above, this represents the multiplicative noise in the television signal. This time varying quantity is inverted by invertor 302, and the resulting signal is used to control the gain applied by gain control 303 to the television signal. Varying the gain in this manner removes the noise according to the procedure described above.

Standard television gain control circuits monitor the energy of the video signal, and apply an amount of attenuation or gain necessary to keep the signal at a desired level. Thus, the gain control smooths out the variations in the amplitude of the received signal.

Standard gain control circuits have a response time of seconds. The amplitude changes caused that invertor 302 instructs gain control 303 to implement, however, occur at the rate of the highest frequency of the voiceband signals, i.e. 5 KHz. This requires gain control circuits to react at least this fast, i.e. 0.2 milliseconds, in order to track voiceband changes effectively. This reaction rate is higher than that of gain control circuits typically used for video signals, but not beyond the most rapid circuits that can be built with inexpensive electronics.

As discussed above, frequency modulated video signals are more immune to interference and are less likely to be disturbed by the phenomenon described in this section. In the event that this interference does corrupt an FM video signal, however, the compensation process can be simpler than the procedure disclosed above. This is because the amplitude of the FM video signals, like FM sound signals, is not varied with time by the modulation, meaning that the amplitude variations of the video component correspond to the interfering signal. Thus, an AGC circuit treating an FM video signal can react to variations in the video amplitude directly, rather than the variations in the sound carrier, and conduct the smoothing operation in the ordinary manner.

Transmitting RF Signals over Two Different Wire Pairs in the Same Bundle

As discussed above, normal internal telephone wiring includes four conductors. Voiceband signals typically use the red/green pair for the first telephone line, and use the yellow/black pair if a second line is connected. Some wiring includes many pairs within the same bundle (i.e., enclosed within a single sheath).

Some of the energy of RF signals can cross over from one wire pair to an adjacent pair within the same bundle, especially on four conductor wire. As frequency increases, this crosstalk effect becomes larger. This will cause interference and prevent the use of the same frequency to transmit different signals on separate pairs in the same bundle. The crosstalk effect thus limits the opportunities presented by extra conductors to the lower frequency ranges.

An example is a cable consisting of a bundle of telephone wire pairs, and whose properties are such that when energy is fed onto one pair at 20 Mhz, it can be received, through crossover, at the end of the cable on a neighboring pair at a level only 40 dB lower than the level on the identical pair. Because AM NTSC signals have a minimum SNR requirement of at least 40 dB, this means that different signals cannot be transmitted onto different pairs at frequencies above 20 Mhz.

If two signals at the same frequencies are fed onto different pairs at separate locations on a network, the interference will depend on the relative locations of the transmitters and receivers as well as the crosstalk. A more interesting and important question is whether two signals fed onto different pairs at the same point on the internal telephone network will interfere. This type of interference is called "far end crosstalk."

Because they are at the same frequency, the energy level of these two signals will decrease at the same rate. Thus, the levels reaching their respective receivers or reaching the point where the pairs separate, will be nearly the same. Also, the amount of energy crossing from one pair to the second will approximately equal the energy crossing in the reverse direction. Furthermore, if the crosstalk energy is higher than other noise energy at the receiver, the SNR seen by either receiver is the ratio of the energy of the signal of interest to the energy crossing over from the neighboring pair. The ratio of signal to noise in this case is simply:

$$SNR = SL1 - (SL2 - CR) \qquad \text{equation (\#5)}$$

where SL1 is the source level of the signal of interest, SL2 is the source level of the signal on the other wire pair, and CR is the loss suffered by SL2 in crossing over. Because SL1=SL2, the SNR is simply CR. If this is less than the minimum SNR for the signal, the crosstalk effects will not degrade the video signal displayed by the television. The quantity CR is called the "far end crosstalk loss."

Because the minimum SNR of AM video signals is at least 40 dB, even a small amount of crosstalk can cause noticeable interference in the television picture. Because FM video signals have a capture ratio of less than 10 dB, however, the possibility that the second pair can provide extra video channels is significantly higher when FM is used.

A problem can occur, however, when the ratio of the upper to lower frequency limits of the transmission band is large, i.e., when the spectral tilt is large. The problem occurs during the instant of time when the carrier of the signal of interest is at a high frequency deviation while the carrier of the interfering signals is at a low deviation. Ordinarily, if the crosstalk loss is greater than the "capture ratio," interference will not occur. Because attenuation at the higher end of the band can be dramatically higher than that at the low end, however, the energy of the interfering signal can actually be greater than that of the signal of interest.

For example, assume two signals are frequency modulated between 10 Mhz and 60 Mhz, and are transmitted onto different twisted pairs within a bundle 500 feet long. Attenuation at 60 Mhz is approximately 10 dB per 100 feet, while attenuation at 10 Mhz is approximately 3 dB per 100 feet. After a transmission distance of 500 feet, therefore, the interfering signal when it is at 10 Mhz will be 35 dB higher than the signal of interest when it is at 60 Mhz. Thus, if the far end crosstalk loss is less than 35 dB, the interfering signal will be at a higher level, and the SNR will be less than 1.

The solution proposed herein is to apply the equalization or pre-emphasis process described above to frequency modulated signals. In that way, the received signal levels will be equal across frequency, and the interfering signal will not have a relative advantage when it is at lower frequencies.

In the specific example given, pre-emphasis would provide the signal energy that is at 60 Mhz at a level 35 dB higher than the energy at 10 Mhz. In that way, the levels of both frequencies at the receive end would be similar.

Figure 4A:
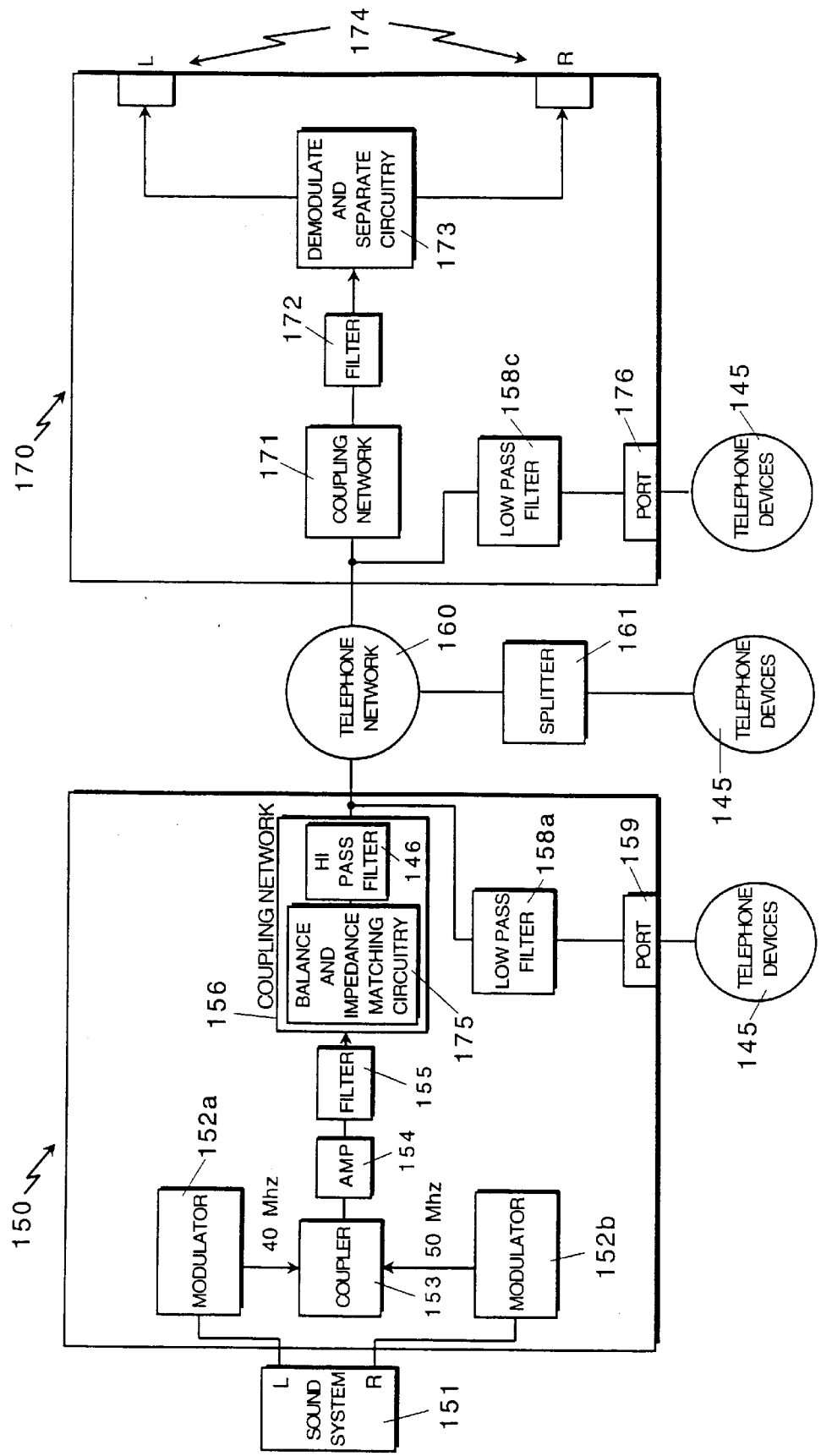
FIG. 4A is a block diagram of a transmitter/receiver pair according to one embodiment of the invention for communicating high-fidelity audio signals over active telephone wiring using FM techniques.
Figure 4B:
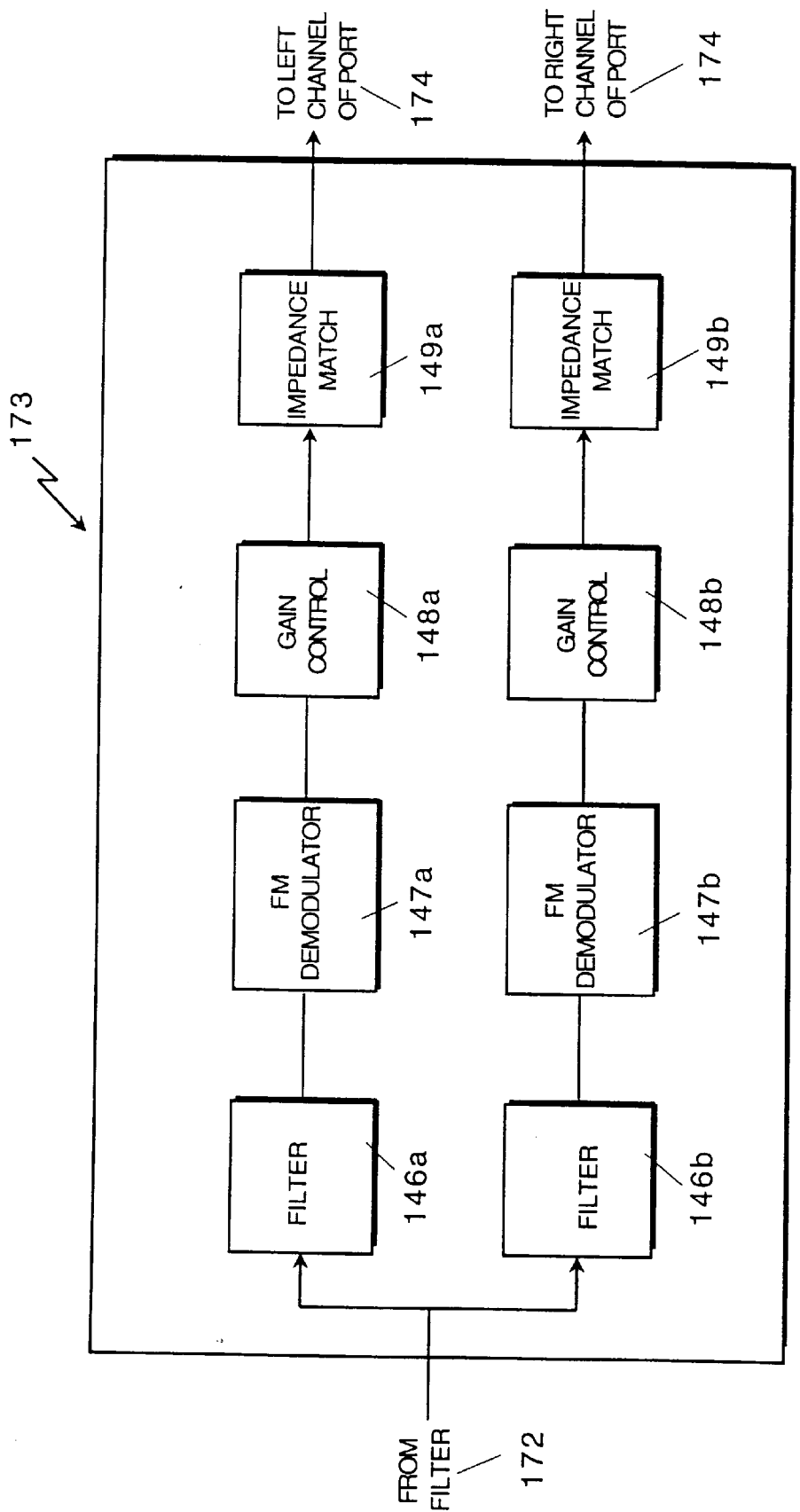
FIG. 4B shows a component of the receiver of FIG. 4A in more detail.

Transmission of High-Fidelity Audio Signals Across Telephone Wiring (FIGS. 4A–4B)

Because most of the energy generated by high-fidelity audio systems is concentrated in the voiceband, signals from those systems will interfere with telephone communications when transmitted across telephone lines. The solution disclosed herein uses a concept similar to that described in the parent application for transmitting infrared signals across active telephone wires. Signals transmitted using that technique are first converted to a higher frequency band, then amplified before transmission onto the wiring. The resulting signal is received at the end of a path, and used to recreate the original waveform at baseband.

The application of this method to high-fidelity audio signals is shown in FIG. 4A. Left and right stereo channels at pre-amplified levels are passed from a sound system 151 to hi-fi transmitter 150. Modulator 152a modulates the left channel at a first RF carrier frequency, (e.g., 45 MHz) and the right channel is modulated at a different RF carrier frequency, (such as 50 Mhz) by modulator 152b. Different carrier frequencies are used so that the modulated signals do not interfere with each other when they are combined by coupler 153 onto the same conductive path. Because well-respected consumer electronic standards establish consistency in the voltage of pre-amplified signals, design of modulators 152 can achieve an economy by relying upon input levels within a narrow amplitude range.

The carrier frequencies must be high enough to convert all of the signal energy above voiceband. It may also help to leave the signals within a band where less governmental restrictions apply. In the U.S., for example, the Federal Communications Commission does not allow any energy below 270 Khz to be fed to the public telephone network. They do allow, however, levels of −30 dbV above that frequency. The U.S. FCC places no limits at all on energy above 6 MHz in frequency.

The typical method for modulating audio signals is to use techniques such as AM, FM, or SSB (single sideband). Each of these methods, of course, includes a companion demodulator which converts signals back to their original form. A modulator/demodulator pair that cooperate in this manner may be thought of as a simple radio station and radio receiver that use the telephone wiring as a transmission medium.

FM transmission is the preferred method because the fidelity of a signal transmitted using that technique is higher than if AM or SSB were used with equally expensive circuitry. Signals converted via frequency modulation also have the added benefit of greater immunity to interference. The audio quality when using FM would be commensurate with standard FM stereo reception. It could even be improved by using higher quality modulation circuits, or by increasing the bandwidth beyond the FCC regulations which restrict the bandwidth of broadcast FM. (More bandwidth is available on the telephone lines because the only frequencies that are occupied on that medium are voiceband frequencies. Also, the bandwidth of FM broadcast stations is approximately 150 KHz, meaning that there is plenty of spectral space available for these types of signals, even if their bandwidth is more than doubled.)

Coupler 154 applies the modulated signals to amplifier 154, and the amplified signals are passed through bandpass filter 155 to coupling network 156. Filter 155 restricts passage of energy between amplifier 154 and coupler 156 to the frequency bands occupied by the modulated hi-fi signals. This prevents extraneous signal output from amp 154 from exiting onto the active residential telephone network 160 and prevents amp 154 from loading down RF signals that may be coupled across network 160 at different frequencies.

Coupling network 156 is shown in FIG. 4A. It includes hi-pass filter 146, and balancing and impedance matching circuitry 175. RF signals passing to coupling network 156 from network 160 pass through hi-pass filter 146, which blocks low-frequency (e.g., voiceband) signals on network 160 so that connection and operation of transmitter 150 does not disturb telephone communications. Filter 146 can be implemented by a single capacitor connected in series along either of the two wires. It is not needed if the telephone wiring is inactive. The RF signals then pass onto network 160.

Figure 6:
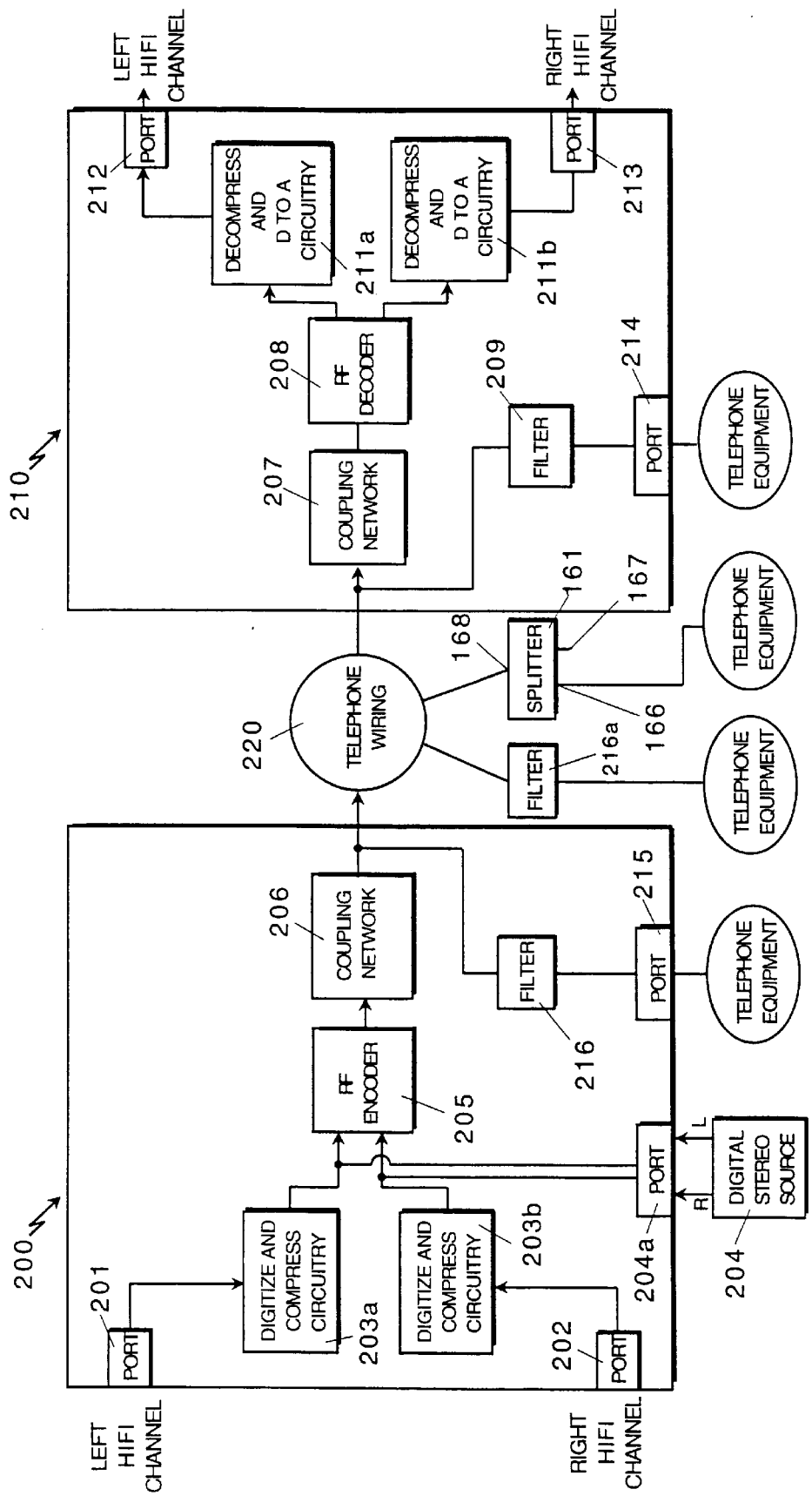
FIG. 6 is a block diagram of a transmitter/receiver pair according to still another embodiment of the invention that uses digital techniques to communicate high-fidelity audio signals over active telephone wiring.
Figure 7:
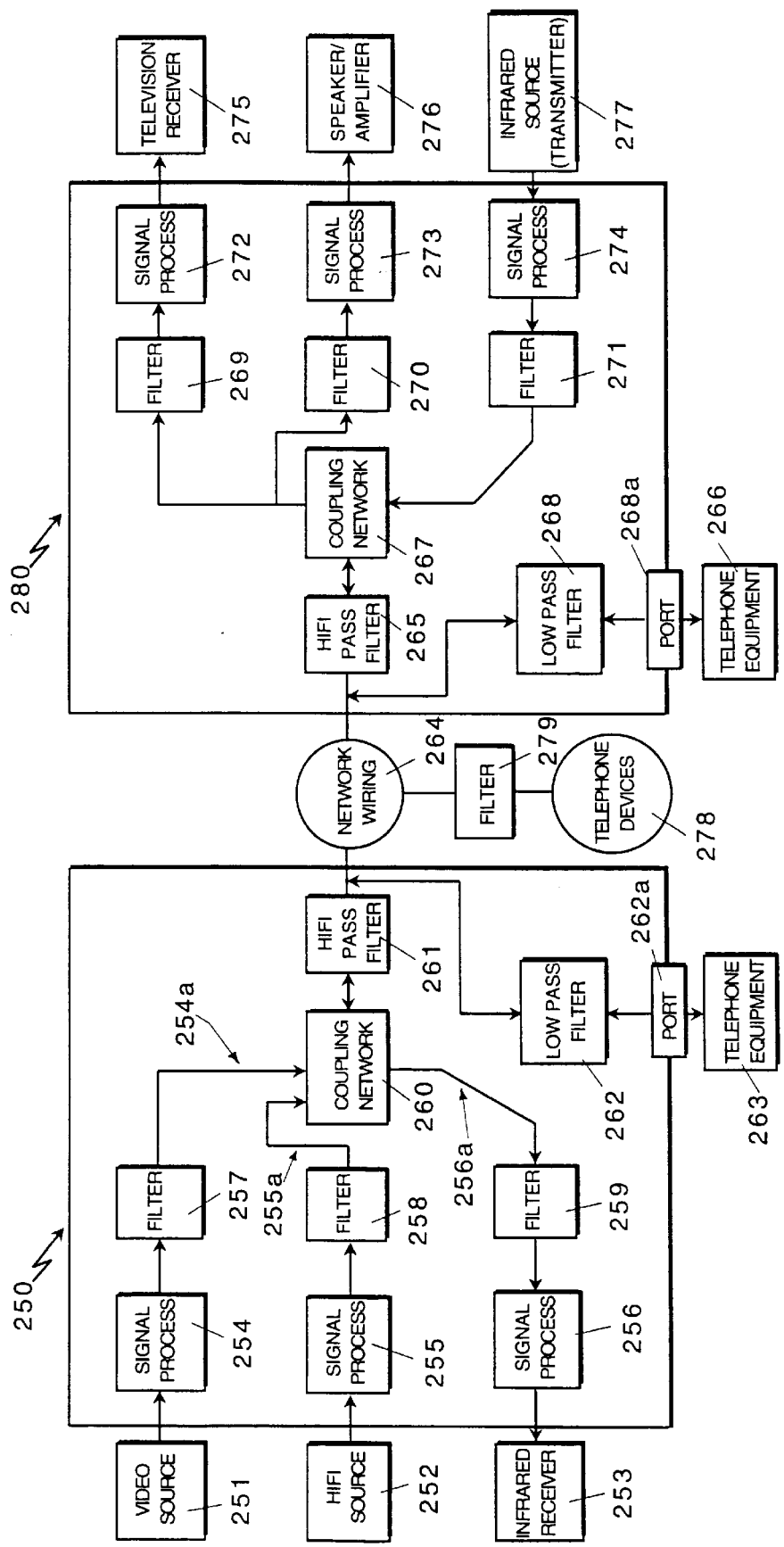
FIG. 7 is a block diagram of a pair of transceivers according to yet another embodiment of the invention for communicating video, hi-fi, and control signals over active telephone lines.

Balancing and impedance matching circuitry 175 matches the impedance of the telephone line, reducing the energy radiated by RF signals crossing that junction, and increasing the efficiency of transmission onto the wiring. It also balances the voltage of signals transmitting in the opposite direction, (i.e. onto the telephone network.) This also reduces radiation of energy. Balancing and impedance matching circuitry are shown in FIGS. 6 and 7 of the parent application, for a coupling network that served as a junction of three paths. Those skilled in the art can convert the wound-torroid described therein to achieve the balancing and impedance matching results for this case, which is a junction of two paths.

Transmitter 150 also includes low pass filter 158a and port 159 to allow connection of telephone devices 145 to network 160 through transmitter 150. Filter 158a isolates telephone devices 145 from network 160 at high frequencies, preventing devices 145 from loading down the modulated signals transmitted by coupling network 156. Filter 158a can also constitute a component separate from transmitter 150. For example, low pass filtering is used to connect other telephone devices 145 elsewhere on network 160 (only one such connection is shown). One convenient way of providing the low pass filtering is to connect each telephone device 145 to network 160 with splitter 161 (FIG. 1); in this case, the internal filters 162a, 162b of spitter 161 provide the low pass filtering.

Once they are applied to internal telephone wiring 160, the modulated signals flow to all points of the network. The hi-fi receiver 170 is connected at any location on network 160 to recover those signals. The recovered signals first pass through coupling network 171. The functional block diagram for coupling network 171 is the same as that for coupling network 156 (FIG. 4A). Signals are received through a high pass filter that presents a high impedance to voiceband signals, preventing the connection of receiver 170 from disrupting telephone communications. (This filter is not needed if the wiring is not active.) The signals next encounter balancing and impedance matching circuitry (similar to that discussed above) to match the impedance of the telephone wiring to the impedance internal to the circuitry of receiver 170. The balancing circuitry unbalances the signal so that it is expressed inside receiver 170 as a voltage relative to ground. The signals then pass through bandpass filter 172, which filters energy outside of the band occupied by the signals of interest. Demodulate and separate circuitry 173 then demodulates each of two signals independently, using known techniques to recreate the two original left and right channel audio signals, which are fed out through ports 174. Demodulate and separate circuitry 173 also adjusts the energy level and impedance of the demodulated signals so that they adhere to the "line out" standards established for audio equipment. Typically, an amplifier (not shown) will be connected to ports 174 to boost the audio signals and drive loudspeakers (also not shown). Of course, such an amplifier can also be provided internally, within the same housing as receiver 170. If an amplifier is provided internally, one need only provide hi-fi receiver 170 and any ordinary pair of loudspeakers to produce the sound signal from sound system 151 at a remote location.

A block diagram of demodulate and separate circuitry 173 is shown in FIG. 4B. Signals fed from filter 172 are split, passing to both filter 146a and 146b. Filter 146a passes only the frequencies of the left channel signal (in this example, 45 MHz), and filter 146b passes only frequencies occupied by the right channel signal (50 MHz). The left channel signal is then processed by FM demodulator 147a, gain control 148a, and impedance matcher 149a. The right channel is processed by identical components.

FM demodulators 147a, 147b demodulate FM encoded signals that occupy the frequencies used by the left and right channel signals, respectively. This demodulation function is well known. After demodulation, the levels of the left and right channel signals are adjusted by gain controllers 148a, 148b to adhere to the well respected standards used for the "line in" and "line out" ports on common audio equipment. Finally, impedance matchers 149a, 149b match the impedance of the conductive paths to the 75 ohm impedance required by the "line out" standards.

Receiver 170 includes low-pass filter 158c and port 176 for connection of telephone equipment. Filter 158c provides the same function as filter 158a. Filter 170 can also be a provided as a separate component.

Fortunately, experiments indicate that internal telephone wiring media are not likely to impose multipath or other distortions as FM encoded audio signals cross network 160. In those experiments, described in the parent application, sound signals were transmitted using frequency modulation with center frequencies of 29.75 Mhz and at 65.75 MHz. Those frequencies were the sound carrier frequencies of the NTSC television signals that were transmitted across residential wiring networks.

The FM sound components of those signals were fed onto the wiring at levels of approximately 25 dBmV, which was 15 dB below the level of the video components. They communicated across all residences without substantial distortion or degradation. (Degradation of the video, but not the audio component was noticed in approximately 5% of all residences.) The attenuation caused by connected telephones, splits in the wiring, and the wiring itself did not reduce the SNR of the signals enough to affect the resultant sound quality. This is due to the fact that FM receivers can tolerate low SNRs at their inputs without displaying significant interference at their outputs.

Besides revealing that the attenuative influence of the network does not reduce the levels of FM signals enough to cause audible degradation, none of the experiments described in the parent application demonstrated interference from "airborne" RF signals picked up by the wiring. This is partly due to the fact that internal telephone wiring acts as a poor antenna at the relatively low frequencies at which the FM encoded signals are transmitted over network 160, and also because quality reception of FM encoded signals is possible at low SNR levels. Furthermore, because sound signals are relatively narrow in bandwidth, it is easy to find bands that are sufficiently wide yet are not likely to be shared by interfering broadcast energy picked up by the wiring.

In some residences and most small offices, telephone networks consist of several dedicated paths that connect directly to a central switch, sometimes called a PBX for private branch exchange, or KSU for Key Service Unit. The conductive paths across this network are usually broken by such a switch. Such a break poses a barrier to the communication of video signals, as is described in the parent application. The same problem will be encountered by audio signals transmitted using the techniques described herein.

Figure 5:
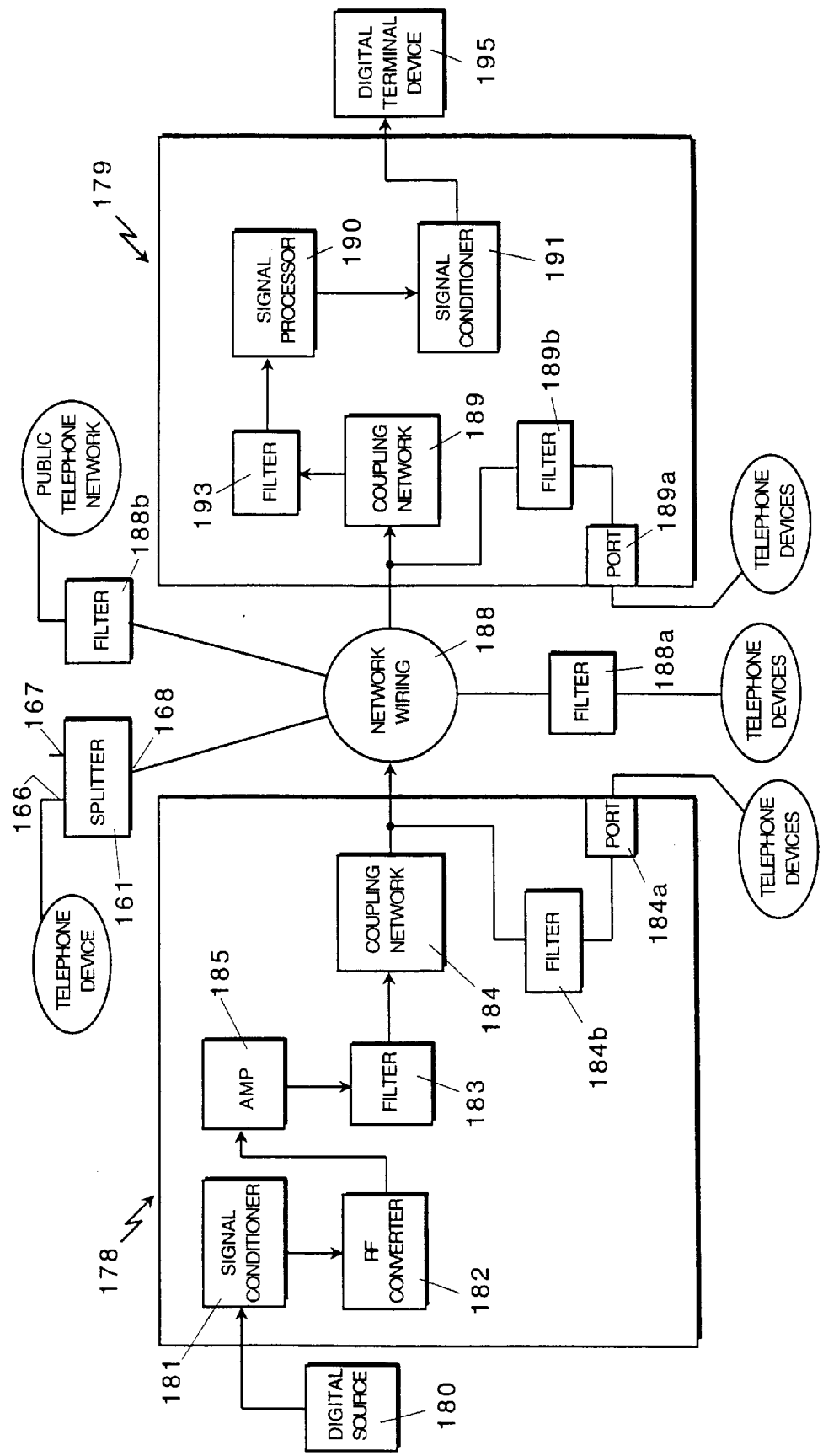
FIG. 5 is a block diagram of a transmitter/receiver pair according to another embodiment of the invention for communicating high-data rate digital signals over active telephone wiring.

Adapter 52 shown in FIG. 5 of the parent application, when installed at such a network switch isolates that switch from RF video signals while allowing those signals to flow freely from one path to another. An adapter designed on the same principles will do the same thing for RF audio signals.

In the event that the dedicated paths in a PBX network are very long, the attenuation of the wiring can cause the SNR at the receiver to fall below acceptable levels. As described in the parent application, an amplifier can be added to the adapter to boost the signal level before the second leg of the transmission path is traversed.

An interesting variation on the system of FIG. 4a is to encode the left and right hi-fi channels using the same modulation system that FM radio stations use to broadcast stereo signals. When this is done, an ordinary radio receiver can receive the signals by connecting its antenna terminals to the telephone wiring through a high-pass filter. Replacing demodulate and separate circuitry 173 in device 170 by an antenna connected to a FM stereo radio provides that result.

Transmission of Digital Signals Across Telephone Networks (FIG. 5)

Transmission of high data rate digital data streams across internal telephone wiring can be accomplished with commercially available devices known to transmit across that medium using wideband signals and frequencies above voiceband. Some of these devices allow communication across wiring that is conducting voice communication. These devices are sometimes used in offices as part of computer communication networks.

These communication systems always transmit signals from one point to another along a "point-to-point" wire that includes no splits or other junctions. An open question is whether these devices can achieve transmission over telephone wiring that is not "point-to-point" but includes many randomly connected paths. This would allow digital devices to communicate in a broadcast fashion, where a signal fed onto the wiring by a digital source spreads across the entire network and is available to a receiver that is connected at any branch of the network.

The method disclosed herein for transmission of digital signals is based on the same principles as those described above and in the parent application for video and hi-fi signals. Experiments described in the parent application demonstrated that NTSC video signals can transmit across networks of residential telephone wiring without substantial distortion. Because very high data rate digital signals have a bandwidth similar to that of NTSC and can often be received with lower SNRs, those experiments indicate that data signals can also transmit in this manner.

Referring to FIG. 5, digital transmitter 178 is disclosed to feed high data rate digital signals, such as the 19.2 Kbit/sec signals generated under the IEEE RS-232 standard, onto active internal telephone network 188. Following is a description of the steps in the transmission process:

1) Digital signals are derived from a digital source 180, such as a the serial port on an IBM compatible PC.
2) The digital signals are fed to signal conditioner 181 that transforms the high and low voltages on the various conductors or "pins" of the port into a single analog wave expressed as voltage variations. This waveform may be as simple as a bi-level signal. It embodies not only the basic signal, but also information required for coordination with the receiver. The output signal produced by conditioner 181 is in the form at which the signal can be efficiently transmitted across telephone network 188.

Many techniques are known to perform this. conversion, such as the Bell 212 standard, which uses "phase-shift-keying" to achieve 1200 band communication in common modems. Devices that transmit signals according to the Bell 212 standard can input data from the serial port of a PC, and feed an analog waveform at voice-band frequencies onto an active telephone line. Another example of this type of conversion is a technique known as Manchester coding, which outputs bi-level waveforms.

3) After being expressed as a voltage variation, the signal may be shifted to a different frequency using known heterodyne techniques. This is accomplished by RF converter 182. If some of the energy of the signal output from conditioner 181 is within the voiceband or overlaps the band used by other signals, this process is required. Otherwise, the process is useful only to take advantage of the different properties of the wiring at the shifted frequency.

Some conditioning techniques convert digital signals to the form of square waves whose energy is concentrated at frequencies above voiceband. Examples are the transmitters of LAN (Local Area Networks) that adhere to the 10BaseT standard. If conditioner 181 outputs its signal in this manner, converter 182 will not be-required.

4) The level of the signal is increased by amplifier 185, and the amplified signal is coupled through a bandpass filter 183, which blocks energy outside the band confining the signal (i.e., voiceband). The signal now occupies the frequency channel at which it will transmit across telephone wiring 188.

5) The signals are then fed through a coupling network 184 and on to the network wiring 188. Network 184 balances the signal and matches the impedance of the telephone line. Network 184 also includes a high-pass filter on the port connecting to the telephone wiring. That filter blocks voiceband energy, making connection and operation of transmitter 178 transparent to voice-band communication. The requirements of coupling network 184 are the same as the requirements of coupling network 156, shown in FIG. 4a.

6) Port 184a is provided for connection of telephone devices. This port connects to the wiring through low-pass filter 184b that prevents those devices from draining the RF energy.

Signals transmitted according to the above process will ordinarily transmit across the entire network 188, and will thus be available to any cooperating receiver 179 that connects to the wiring anywhere in the residence.

Digital receiver 179 is also shown in FIG. 4. Following are the steps in the receiver process:

1) Receiver 179 connects to network wiring 188 to derive signals transmitting across that medium.
2) The signals are fed through coupling network 189, which performs the same functions as coupling network 171. The signals first pass through the high-pass filter of that network. That filter blocks voiceband energy. Next, coupling network 189 matches the impedance of the telephone line and unbalances the signal.

3) Signals emerging from the coupling network pass through band-pass filter 193, which attenuates energy outside the passband of the signal.

4) The signals are then applied to signal processor 190, which converts the signals to baseband frequency with an energy level inside the range expected by signal conditioner 191. This conversion may involve a shift in frequency or a demodulation, each of which can be accomplished using well known techniques, and are the inverse of the treatment provided by RF converter 182. Processor 190 may also perform an alteration of signal level using known AGC (automatic gain control) techniques. This is necessary because the level of the signal fed to the line by transmitter 178 may be very high, and if the transmission path is short, the signal received by receiver 179 will also be very high. An AGC can reduce the level of this signal to a range that is more easily managed by ordinary electronics. If transmitter 178 does not include RF converter 182, and the level of the signal received at network 189 will always fall within the range permitted by conditioner 191, processor 190 will not be required.

5) Signal conditioner 191 converts the voltage variations output by processor 190 into a digital data stream in a form expected by the connected digital terminal device 192. When the output of processor 190 is a square wave, digital devices may be able to read this output directly. In this case, conditioner 191 is not needed.

6) Port 189*a* is provided for connection of telephone devices. This port connects to the wiring through low-pass filter 189*b* that prevents those devices from draining the RF energy.

Techniques are disclosed herein and in the parent application to increase the maximum path length of transmission of video signals. These techniques will also facilitate transmission of high data rate digital signals as described above. Following is a partial list:

1) providing each telephone port on the network with either a low pass filter (shown in FIG. 5 as LPF 188*a*), or splitter 161, which includes a low-pass filter.

2) using frequency modulation in converter 182 to increase interference rejection;

3) choosing transmission channels that are less likely to be used nearby broadcast sources, thus reducing the chance of interference;

4) reducing transmission frequency to lower the attenuation caused by the wiring, to lessen the ability of the wiring to pick up interference, and to allow higher signal levels without violating airborne radiation regulations;

5) providing a low-pass filter, shown in FIG. 5 as filter 188*b*, along the path connecting the network to an external signal source, such as the public telephone system, in order to suppress the higher harmonics of ringing voltage and switch-hook transients originating at the external source.

Transmitter/receiver pair 178, 179 can also achieve two-way communication by transmitting data in the reverse direction, from receiver 179 to transmitter 178, over the same pair of telephone wires of network 188 (but over a different frequency band) using the same techniques as those described above. Techniques for simultaneous transmission and reception of various signals through a single connection to the wiring are disclosed in a later section of this document (entitled "Simultaneous Transmission of Multiple RF Signals Across Internal Telephone Wiring").

Transmitter/receiver pair 178, 179 can also use the same channel for alternating two-way transmission if they cooperate to ensure that only one device is actively transmitting at any one time. Such systems of cooperation are used in well-known computer communication networks.

Because the digital transmission technique described above is independent of the type of information represented by the data streams, digitized video signals can transmit across networks of telephone wiring using that method. Transmission of digital video using this technique is facilitated by advancements in the compression of digitized video signals. These have enabled an impressive reduction of the data rate of the signal bitstreams and, consequentially, an impressive reduction of the bandwidth required to transmit the signal. Commercial quality video signals can now be represented by analog waveforms covering less than 2 Mhz of spectrum.

When transmitter 178 and receiver 179 transmit digital video using the techniques described above, the process is a specific embodiment of the more general technique disclosed in the parent application. The functions performed by RF converter 3 of the parent application correspond to those performed by signal conditioner 181 and RF converter 182, and those performed by RF converter 19 in transceiver 15 in the parent application correspond to the functions performed by signal processor 190 and signal conditioner 191. The amplifiers, bandpass filters, and coupling networks of the corresponding devices also perform identical functions.

Transmission of Hi-Fidelity Audio Signals Across Telephone Networks Using Digital Techniques (FIG. 6)

A system for transmitting high-fidelity audio signals based on FM techniques was described earlier in this document with reference to FIGS. 4A–4B. Inexpensive electronic components that perform FM modulation, however, may not be precise enough to support the sound quality generated by audio components that operate on digital principles. It is for this reason that, for example, music created directly from compact discs meets higher specifications than music received from FM broadcasting, even if the source of the broadcast music is a compact disc.

Digital transmission techniques provide an acceptable alternative. The proposed procedure (shown in FIG. 6 and discussed in detail below) begins by digitizing audio signals or starting with a digital audio source. These signals are transmitted using the techniques described in the previous section. The analog signal is then reconstructed at the receive end. Digitizing and reconstructing can be accomplished by devices known to digitize sound signals and to transform them back with no significant loss in quality.

The digital transmission concept is shown in FIG. 6. The system includes hi-fi transmitter 200 that accepts analog pre-amplified left and right channels from an analog stereo system (not shown) or digital audio channels from a digital stereo source 204. Transmitter 200 processes these signals and transmits them onto the active telephone wiring 220. Hi-fi receiver 210 recovers these signals from the telephone wires at a second location on network 220 and converts them to their original, pre-amplified form so that the audio signals can be used as input to a speaker/amplifier system.

Transmitter 200 accepts the left and right channel analog stereo signals at ports 201 and 202 and transmits them to digitize and compress circuitry 203*a* and 203*b*, respectively. Because well-known consumer electronic standards establish consistency in the voltage of preamplified signals, design of circuitry 203*a* and 203*b* can achieve an economy by relying upon input levels within a narrow amplitude range.

According to mathematical principles, the digitization rate must be at least twice as high as the highest signal frequency in order to capture all of the information. Thus, 50,000 samples per second will capture all information up to 25,000 Hz, a frequency slightly higher than the highest frequency used in standard digital sound systems, and above the range of human hearing.

The left and right channel analog signals are digitized and compressed by converter and compression circuitry 203*a*, 203*b*, respectively. The preferred method is to use the standard digitization and compression procedure used to create common compact discs. The advantage of that method is that inexpensive integrated circuits are available to accomplish digitization and compression according to that standard. Use of a CD coding system for circuitry 203*a*, 203*b* also ensures that the transmission process will maintain CD sound quality within the system.

The CD system uses 16 bits to represent each sample of the signal, and uses compression techniques to reduce this quantity to 12 bits. Because 50,000 samples encoded at 12 bits each results in 600,000 bits, digitize and compress circuitry 203*a*, 203*b* will each produce a datastream of 600,000 bits per second.

Some hi-fi components, especially CD players, output their signals as digital datastreams as well as in analog form. When connecting to these players, circuitry 203 is not necessary. Port 204*a* is provided to receive these digital outputs and to feed them directly to RF encoder 205, the next step in the processing stream.

To transmit this digital information across telephone wiring at a very low error rate, known circuits common to computer "local area networks" can be used. The two datastreams are passed to this type of circuit, RF encoder 205, which represents each of them as variations of voltage across two wires at a frequency above voiceband. The input to RF encoder 205, by contrast, is digital and is typically expressed as time varying bi-level voltages on several conductors. An example of an RF encoder that inputs digital signals and outputs an RF signal between 3 MHz and 15 Mhz, i.e. above the voiceband, are any of the transmitters that adhere to the IEEE 10BaseT standard. (As described in the background section of this document, that standard governs the Local Area Networks (LANs) that transmit 10M bits/sec of data over twisted pair wires that are dedicated for point-to-point communication.)

The signal generated by encoder 205 passes through coupling network 206 onto telephone network 220. Network 206 feeds that signal to telephone wiring 220 through a hi-pass filter that prevents disturbance with telephone communications. (This hi-pass filter is not necessary if the wiring is inactive.) Coupling network 206 also matches the impedance of the telephone line and balances the signal across the two leads of the telephone wiring. This reduces radiation and increases the efficiency of transmission onto the wiring. The function of coupling network 206 is identical to that of network 156, shown in FIG. 4A.

Transmitter 200 also includes a low-pass filter 216 and a port 215 for connection of telephone equipment to network 220. Filter 216 prevents the telephone equipment from loading down the RF signals fed onto telephone wiring 220. To prevent telephone devices connected to network 220 from loading down RF signals from transmitter 200, low pass filters are provided for each telephone. These are shown in FIG. 6 by filter 216*a* and splitter 161, which includes a low-pass filter. Splitter 161 also provides other benefits when transmitting RF signals across telephone networks. These were described earlier in this document.

The frequency and level of the signal that is fed to telephone wiring 220 is determined by RF encoder 205. As in the case of FM modulated audio signals described earlier, these values should be such that the SNR at the receiving locations is sufficient to provide high quality stereo. In this case, that requirement is roughly equivalent to the requirement of error-free reception of the digital data stream. The signal level must also be low enough to keep RF radiation from the wiring below the legal limits established for the frequencies of the signal, and below the limits on the amount of energy that can be fed to the public telephone network. Experiments performed by the inventors in transmitting video signals across all but the largest residences, indicate that the same combinations of frequency and signal levels, which are within legal limits, will transmit hi-quality stereo over the active telephone lines within all but the largest residences in the U.S. This is because the SNR required at the input to an AM video receiver is much higher than the SNR required at the input to high data rate digital receivers such as those that adhere to the 10BaseT standard described earlier.

The RF signal is transmitted onto, e.g., a red-green wire pair of telephone network 220 and propagates over the telephone link. At the receiving end, the RF signal is recovered by coupling network 207. The functions performed by network 207 are identical to those performed by network 171 of FIG. 4A. Coupling network 207 feeds the RF signal to RF decoder 208, the companion to RF encoder 205. Decoder 208 recreates the left and right digital datastreams from the recovered signal using known means. Thus the outputs of decoder 208 will typically be time varying bi-level voltages adhering to one of the common standards for digital communications.

The remaining step in the receiving process is to recreate the analog left and right channel audio signals from the digital datastreams. This is the inverse of the digitize-and-compress process performed by circuitry 203, which follows the standard of common CD players and is described above. It is performed by decompress and D/A (digital to analog) integrated circuitry 211*a*, 211*b*. The resultant left channel audio signal in analog form is applied to output port 212, and the right channel audio signal is coupled to output port 213. Because the preferred decompress and digital-to-analog circuitry is common to virtually all CD common players, circuitry 211*a*, 211*b* can be provided inexpensively.

To recreate the sound, an amplifier (not shown) can accept the recreated signals from ports 212 and 213 and drive speakers (also not shown), which serve as the "receivers" for the audio system. An amplifier can also be provided internal to receiver 210. In this case one need only provide receiver 210 and any ordinary pair of loudspeakers to produce the sound signal from a sound system at a remote location.

Receiver 210 also includes a low-pass filter 209 and a port 214 for connection of telephone equipment to the network. Filter 209 prevents the telephone equipment from loading down the RF signals fed onto the wiring. Likewise, telephone equipment connected elsewhere on network 220 should use low pass filters, or even more preferably, splitter 161 (FIG. 1).

Because of the limitations, described earlier, of transmitting hi-fi signals across AC power lines, or broadcasting hi-fi signals using radio waves, transmitter/receiver pair 200, 210 constitutes a significant advance in consumer electronics. The advance is even more pronounced when the ability to transmit infrared control signals in the reverse direction is included. Technology to achieve simultaneous transmission of these signals is disclosed in the next section with regard to FIG. 7.

Figure 8:
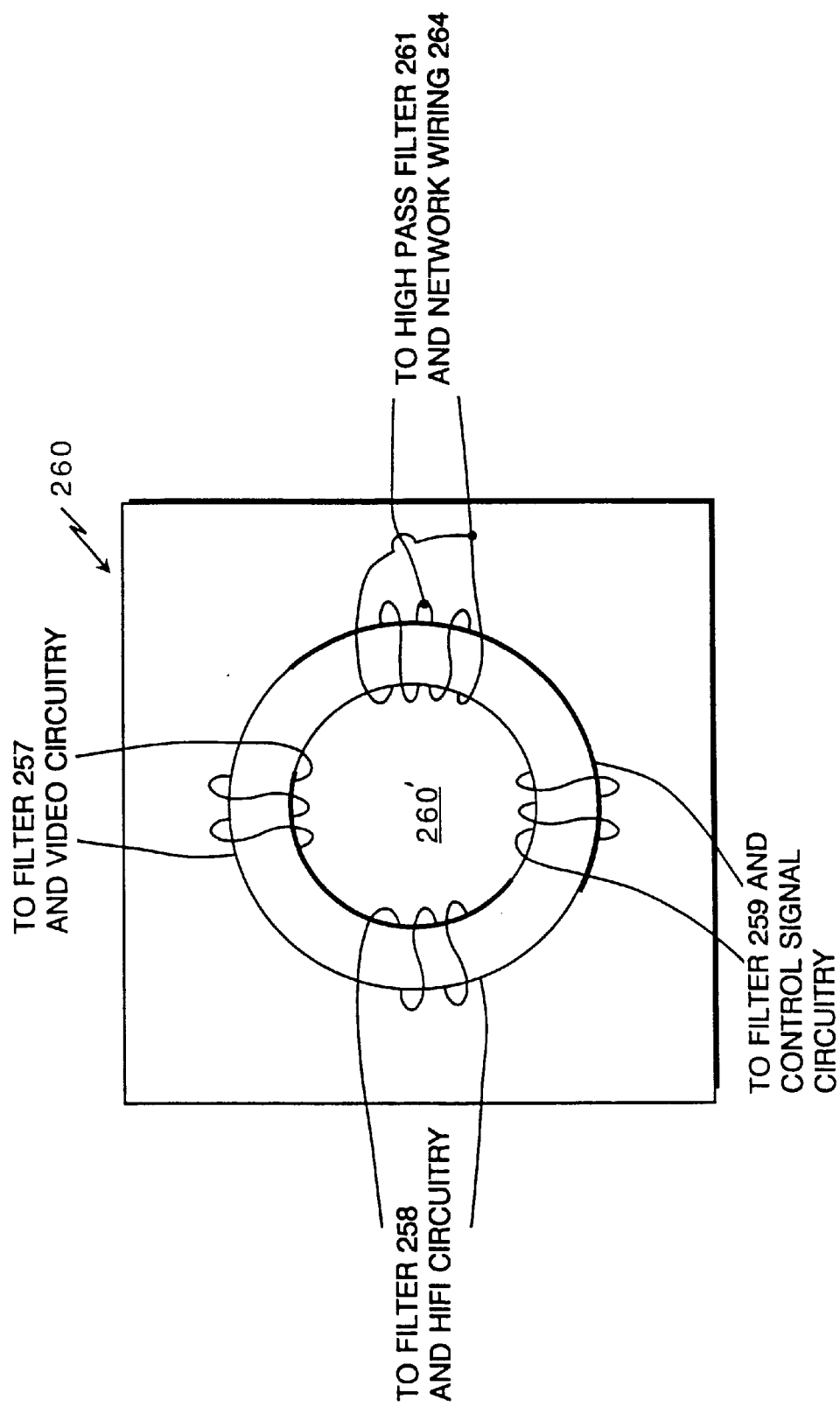
FIG. 8 shows a portion of the coupling network used in the transceiver pair of FIG. 7.
Figure 9:
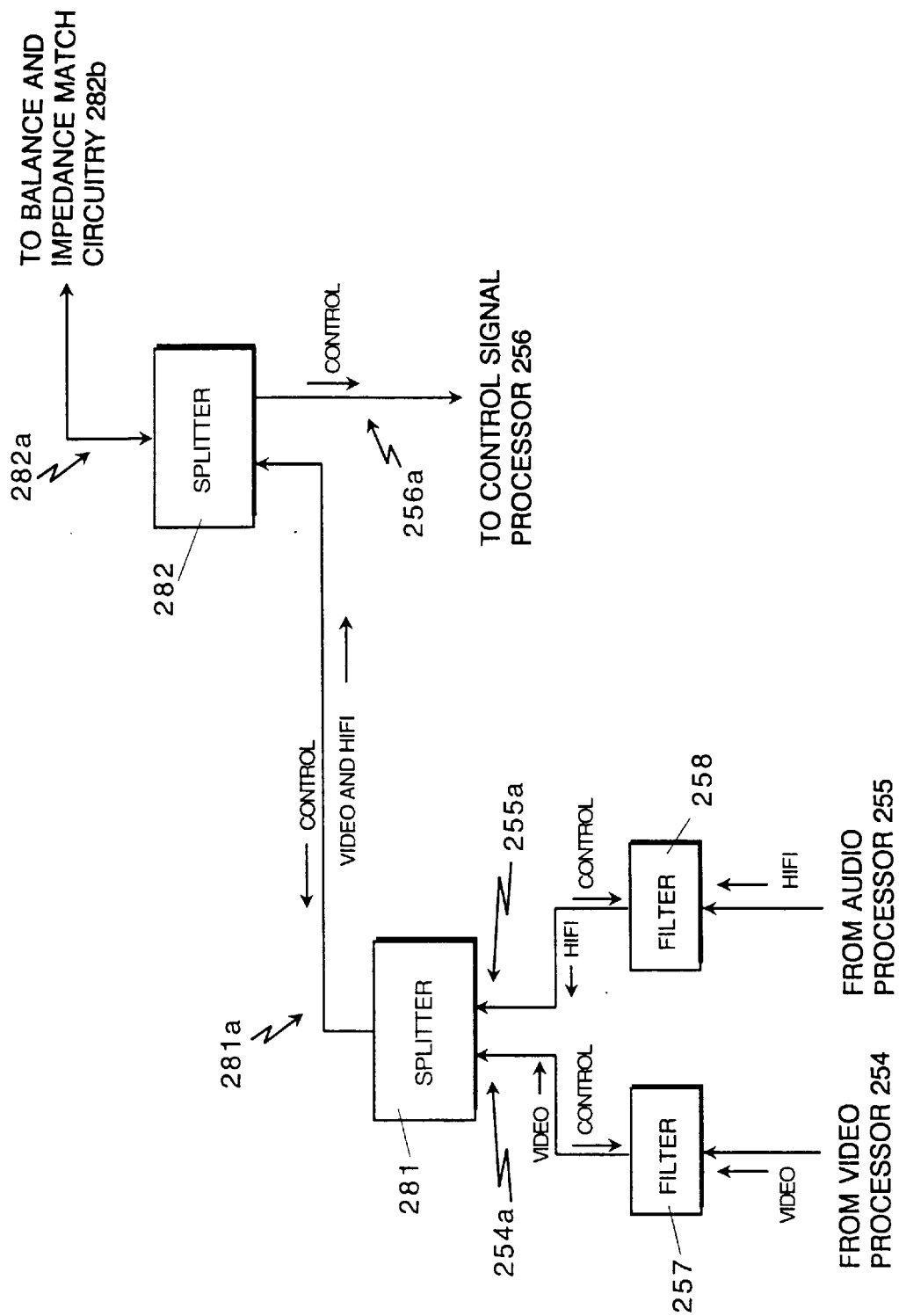
FIG. 9 shows another portion of a coupling network used in the transceiver pair of FIG. 7 that provides directional multiplexing.

Simultaneous Transmission of Multiple RF Signals Across Internal Telephone Wiring (FIGS. 7–9)

The parent application, together with the previous sections in this application, describe various techniques for transmitting audio, video, digital, and control signals from infrared transmitters over active networks of internal telephone wiring using radio frequencies. The parent application also describes a pair of transceivers that cooperate to transmit video from one transceiver to the second, and control signals from the second transceiver to the first. In this section, these results are extended to disclose a transceiver that can connect to an the active wiring of a residence to transmit several RF signals of varying types while receiving several others at the same time.

The general design will be described using a pair of transceivers that cooperate to transmit hi-fi, video, and control signals from infrared transmitters across telephone wiring. The processing and signal flow within this pair is shown in FIG. 7.

A video source 251 and a hi-fi source 252 are shown connected to the transceiver on the left, herein referred to as the video/hi-fi transmitter 250. A television receiver 275 and a speaker/amplifier 276, are shown connected to the transceiver on the right, herein referred to as the video/hi-fi receiver 280.

A wireless infrared source 277, which is normally a hand-held infrared transmitter, sends infrared control signals through the air to video/hi-fi receiver 280. An infrared receiver 253, which corresponds to the infrared pickups on video source 251 and hi-fi source 252, receives the infrared control signal after transmission over active telephone wiring and reconstruction by transmitter 250 (as described in detail in the parent application and as also described below). Telephone equipment 263 and 266 is shown at both ends because it is likely to be connected at any telephone jack. Likewise, telephone equipment 278 is connected through low pass filter 279 (which may be one of the low pass filters of splitter 161 of FIG. 1) at any location on telephone network 264.

Communication of signals across telephone wiring 264 by transmitter 250 and receiver 280 functions as follows. The signals from sources 251, 252 are first processed by respective processors 254, 255 to convert them to the form in which the signals will be efficiently transmitted over the network 264. (The details of this processing is described later on.) These signals are then passed through respective bandpass filters 257, 258 and are combined by a coupling network 260 for transmission over a single pair of wires (e.g., the red-green pair) of network 264. It will be appreciated that coupling network 260 receives signals from all sources connected to transmitter 250, as well as incoming signals recovered from telephone network 264. The combined, outgoing signals emerge from coupling network 260 and pass through a high-pass filter 261 onto network 264. Filter 261 presents a high impedance to telephone signals from network 264 and makes the connection of transmitter 250 transparent to voiceband activity on network 264.

At receiver 280, signals are recovered from the line through a high-pass filter 265 and are applied to coupling network 267. The functions of filter 265 are similar to those of filter 261. Coupling network 267 has an output port for each of the connected receivers, e.g., television 275, and amplifier 276, which are the final destinations of the video and audio signals, respectively. The output ports of coupling network 267 are applied to bandpass filters 269, 270 and then to processors 272, 273 where the video and audio signals are converted to a form compatible with their associated receiver 275, 276, respectively. The details of this processing are described later on.

The general procedure just described is embodied in transceivers 1 and 15 of the parent application, which cooperate to transmit video and infrared signals. This procedure is also used to communicate hi-fi audio signals and digital signals by the three transmitter/receiver pairs 150/170, 178/179, and 200/210 described above.

Communication of signals also takes place in the opposite direction. Specifically, infrared control signals from source 277 are detected by process 274, converted to electrical signals at an RF frequency, and transmitted through filter 271 and coupling network 267. These signals then transmit through filter 265 and across network 264. At video/hi-fi transmitter 250, the control signals are received through filter 261 and transmit through coupling network 260 and filter 259, being received by signal process 256. That component converts the control signals to infrared form, and broadcasts them to receiver 253.

Although some of the functions of the electronic components in FIG. 7 are described above and in the parent application, the description is repeated below for easy reference.

Coupling network 260 provides junctions for the signals converging at transmitter 250. Coupling network 267 provides an analogous function in receiver 280. In addition to supplying a simple junction of four paths, each network 260 and 267 also matches the impedances of the various paths, and balances signal energy across the two leads of the transmission line (i.e., the red-green wire pair of network 264 over which the signals are transmitted). Both the impedance matching and signal balancing reduce radiation, while impedance matching makes transfer of energy across the junction that each coupling network 260, 267 introduces more efficient.

One embodiment of coupling network 260 is shown in FIG. 8. The principal element of this network is a transformer wound on a torroid core 260'. There are four isolated windings corresponding to the ports leading to filters 257, 258, 259, and 261. The winding arrangement method shown for the phone line port (in which two lines of the port are connected to a center tap of the winding and interconnected ends of the coil) serves to maximize the balance of signals transmitting on the path leading from that port.

There are different number of windings on the torroid core for the four different ports. (The number of windings shown are only for purposes of illustration.) The turns ratios determine, approximately, the impedance matching between the telephone port and the other three ports. Different ratios will be needed if the telephone line port has a different impedance at the frequencies used for transmission of the various signals.

Coupling networks 260 and 267 can also be designed, using known devices (such as RF splitters and filters) to provide the function of directional multiplexing. This can be used to separate or isolate the three different signals that converge at their ports. These functions and the reason they are required are described in greater detail below.

High-pass filter 261 (FIG. 7), which can be provided by a single capacitors connected in series along either of the wires of the conductive path, connects between network coupler 260 and the telephone network 264 to block transmission of signals below the highest frequency ordinarily used by telephone equipment. High-pass filter 265 performs an analogous function in receiver 280. This renders connection and operation of the transceivers completely transparent to any low-frequency communications. In the parent application, these high-pass filters are included as part of the coupling networks.

Ports 262a, 268a are supplied by transmitter 250 and receiver 280 for connection of telephone equipment. These ports are connected to telephone network 264 through low-pass filters 262 and 268, respectively. Filters 262, 268 prevent telephone equipment 263, 266 from "loading down" any of the signals used by this communication system (i.e., the video, audio, and control signals exchanged by transmitter 250 and receiver 280 over network 264).

As discussed above, signal processing is nearly always required to transform the signals before they are fed to telephone network 264. According to the transmission techniques described above and in the parent application, signal processor 254 may modulate, frequency shift, or amplify the video signal it receives as input. Signal processor 255 may perform the same or different processes on the hi-fi audio received from source 252. Finally, processor 274 (in receiver 280) transduces infrared signals from IR transmitter 277 to electrical signals and modulates and amplifies the electrical signal for transmission over network 264.

Similarly, processing of the recovered signals is sometimes needed to convert them to a form expected by the target receiver 275, 276, 253. According to the communication techniques described above and in the parent application, processor 272 may demodulate or frequency convert the video signals for television receiver 275 and it may also perform automatic gain control. Signal processor 273 demodulates and performs AGC on the audio signals destined for speaker/amplifier 276. Finally, signal processor 256 (in transmitter 250) also demodulates its input, amplify the resulting signal, and convert it to infrared light for use by infrared receiver 253.

The details of the processes that apply to hi-fi signals and some of those that apply to video signals are described earlier in this document. Other details that apply to video signals and details that apply to control signals from infrared transmitters are described in the parent application. It will be apparent to those skilled in the art that providing for communication of digital signals within this system can use the signal processing described in connection with transmit/receive pair 178/179 described earlier in this disclosure.

Filters 257, 258, 259, 269, 270, and 271 provide frequency separation and isolation between the video, audio, and control signals, and between this group of signals and the telephone signals present on active telephone network 264. If, for example, a video signal transmits within the band spanning from 24 MHz to 30 Mhz, the passband of filters 257 and 269 will cover those bands. If audio signals transmit within the band from 45 to 50 Mhz, the passband of filters 258 and 270 covers those frequencies. Finally, if the control signals transmit within a narrow band centered at 10.7 MHz, filters 271 and 259 will be passband filters centered at that frequency. The specifics of these functions are described in the following paragraphs. An explanation of how directional multiplexing in the coupling networks can also provide some of these functions is presented after that.

Each of the filters 257, 258, 259, 269, 270, and 271 are applied across one of the two-wire paths leading from a coupling network 260, 267 towards one of the sources or receivers. These filters will attenuate signals at frequencies outside the band of the signal intended to cross that path. Although this filtering is not always necessary, it can never be functionally harmful, and it can be important for several reasons.

First of all, filtering can prevent the component opposite the coupling network from loading down a foreign signal, draining energy away from its intended receiver. One example is filter 257, which, by blocking energy at the frequency of the control signals (from IR transmitter 277), substantially prevents loading processor 254 from loading down the energy of those signals. If not for filter 257, processor 254 could attenuate or reduce the SNR of the control signal incident at processor 256 below adequate levels. Filter 258 functions in a similar way to substantially prevent loading of the control signals by processor 255, and filter 271 substantially prevents loading of the video signal or the hi-fi signal by processor 274.

Filtering can also prevent receivers or processing components from reacting to signals other than the signals of interest. If filter 259, for example, has a narrow passband centered at the frequency of the control signals, it will prevent the video signal and the hi-fi signal from reaching signal processor 256. Because the video and hi-fi signals are being transmitted onto telephone network by transmitter 250, they are at a much higher energy level than the recovered control signals for infrared receiver 253, and would ordinarily disrupt processor 256. Similarly, filter 270 may be necessary to prevent the control signals from disrupting the operation of processor 273.

As described in the parent application, processor 272 can include a video channel conversion possibly followed by AGC, or automatic gain control. Neither of these processes, however, are likely to be affected by the control signal energy. Furthermore, control signal energy reaching the TV is not likely to be a problem because televisions suppress energy at frequencies other than the ones to which they are tuned. The attenuation of the control signals from IR transmitter 277 provided by filter 269, therefore, may not be important.

Finally, filtering can prevent energy generated by a source 251, 252, 277 at out-of-band frequencies from reaching the rest of the system. Effectively, this "cleans up" the respective source signals. An example is filter 271 which, by having a passband cutoff slightly above the fundamental frequency of the control signals produced by processor 274 can block harmonics of such signals. This will be important if the harmonics include energy at the same frequencies over which video signals (destined for receiver 275) or the audio signals (for use by speaker/amplifier 276) are transmitted. For example, if processor 274 generates a control signal centered at 10.7 Mhz, it is likely to have significant harmonic energy at 21.4 Mhz. If filter 271 is a low pass filter with a cutoff of 15 Mhz, it will pass the fundamental of the control signal, but not the 21.4 Mhz harmonic. This will prevent that energy from interfering with reception, by process 272, of video signals covering that frequency.

Processor 254 includes a video modulator and processor 255 includes a hi-fi modulator. Thus, they are likely to include filters that suppress out-of-band frequencies internally.

As discussed above, coupling networks 260 and 267 can provide directional multiplexing to achieve some of the isolation described above. Specifically, coupling network 260 can be designed to isolate the three paths leading to the video, audio, and control processors. This will substantially prevent the video and audio signals from being applied to, and possibly interfering with the operation of, control signal processor 256.

FIG. 9 shows a design that will accomplish this isolation, as embodied in network coupler 260. The signals from video processor 254 and the signals from hi-fi processor 255 are applied to the inputs of splitter 281. Splitter 281 couples both input signals to splitter 282 through line 281a, but does not permit either input signal to cross over between the video and audio paths. That is, splitter 281 provides a high degree of isolation between paths 254a and 255a. Another port of splitter 282 is coupled through line 256a to control signal processor 256. The third port of splitter 282 is connected through line 282a, through balancing and impedance matching circuitry 282b to high-pass filter 261. Splitter 282 allows the combined video and audio signals to flow through to filter 261 and onto telephone network 264, but prevents crossover of those signals to line 256a that carries the control signals. Control signals transmitting from filter 261 pass through splitter 282, with half of the energy transmitting towards control signal processor 256, and the other half transmitting towards the other processors 254, 255. Thus, the control signals suffer approximately a 3 db loss due to the split. Processors 254 and 255, however, are substantially prevented from loading down the control signal energy.

Coupling network 267 can provide similar directional multiplexing. Specifically, coupling network 267 can isolate the three paths leading between the telephone network 264 and the video, audio, and control processors 272–274 in receiver 280. This can prevent the control signal from being applied to signal processors 272, 273, and can prevent processor 274 from loading down the video or audio signals.

The embodiment of coupling networks that perform the balancing and impedance matching described above is described in detail in the parent application for the case of RF video signals and RF modulated control signals. Techniques to extend those networks to include other RF signals is a procedure that will be apparent to those skilled in this technical field. Techniques to include the directional multiplexing in these networks are also well known.

Although the transmitter 250 and receiver 280 transmit video and audio in one direction and control signals in the reverse direction, these devices demonstrate the principles of transmission and reception of multiple RF signals by a single device that connects to active telephone wiring. Using these techniques, those skilled in the art can design devices that transmit and receive any number of video, audio, and other sources (such as digital sources). The limits on the number of signals will be dictated by governmental limits on electrical radiation and the increasing attenuation of the wiring as higher frequencies are used.

Other embodiments are within the scope of the following claims.

We claim:

1. A signal transmission system comprising:
    a twisted-pair telephone wiring network having a junction and at least three twisted-pair lines connected to one another at said junction, said network having a first port connected to a telephone exchange and a second port connected to a telephone device;
    signal generating means for generating a first digital signal at a first location,
    first converting means operatively connected to said signal generating means at said first location for converting said first digital signal to an analog signal having substantially the same information content as said first digital signal;
    transmitting means operatively connected to said converting means and said wiring network for transmitting said analog signal onto said network;
    receiving means operatively connected to said network for receiving said analog signal over said network at a second location substantially spaced from said first location;
    second converting means operatively connected to said receiving means at said second location for converting said analog signal to a second digital signal having substantially the same information content as said first digital signal;
    digital processing means operatively connected to said second converting means for operating on said second digital signal; and
    at one of said first location and said second location, means for presenting a high impedance to signals whose energy is concentrated at frequencies below the highest frequency used for communication by ordinary telephone devices, while allowing said analog signal to transmit substantially unaltered.

2. The system defined in claim 1 wherein said means for converting including means to express said analog signal within in a selected frequency range, said selected frequency range exceeding the highest frequency used for communication by ordinary telephone devices.

3. The system defined in claim 2 wherein the information content of said first digital signal is embodied in the shifting between two discrete voltage levels, and said expressing means including means to respond to said shifting to accomplish one of:
    (a) frequency modulation of an analog carrier signal by shifting the frequency of said carrier between two frequencies,
    (b) creation of a time-varying analog signal that shifts regularly between two voltage levels, shifting from high to low in response to one of said two discrete voltage levels, and low to high in response to said other level, thereby creating a square wave with substantially all of its energy above the highest frequency used for communication by ordinary telephone devices.

4. The system defined in claim 1, further including means for impeding said analog signal from being coupled from said network to said telephone device.

5. The system defined in claim 1 wherein said transmitting means includes means for balancing said analog signal on said network wiring.

6. The system defined in claim 1, further comprising means connected to said network for reducing interference at said digital processing means owing to reflections of said analog signal in said network.

7. The system defined in claim 6 wherein one of said twisted-pair lines has an open termination, said means for reducing interference including means connected to said network at said open termination for matching impedance of said one of said twisted-pair lines at higher frequencies, thereby eliminating reflection of said analog signal at said open termination.

8. The system defined in claim 7, further comprising means at said open termination for inserting a connector of a high-frequency device and means for bypassing said means for matching impedance upon reception of said connector by said means for inserting.

9. The system defined in claim 7, wherein said means for converting includes said means to express said analog signal within in a selected frequency range, said selected frequency range exceeding the highest frequency used for communication by ordinary telephone devices.

10. The system defined in claim 9, further including means for impeding said analog signal from being coupled from said network to said telephone device.

11. The system defined in claim 2, further comprising a video source at said first location, and a video transmission system for transmitting video information from said source across said network to a video destination at said second location.

12. The system defined in claim 11, wherein said video transmission system further includes circuitry to receive said video information from said video source and to re-express said video information as a time-varying video signal substantially confined within a video frequency range that is different from and does not overlap said selected frequency band and the frequency band occupied by ordinary telephone signals, said receiving and re-expressing circuitry being located at said first location.

13. The system defined in claim 12, wherein said receiving and re-expressing circuitry receives said video information as a baseband video signal and re-expresses said video information in said video frequency range by frequency modulating a carrier with said baseband video signal.

14. The system defined in claim 9, further including:

alternative signal generating means and alternative converting means at said second location for converting an alternative digital signal to a alternative analog signal having substantially the same information content as said alternative digital signal, alternative transmitting means operatively connected to said alternative converting means and said wiring network for transmitting said alternative analog signal onto said network at said second location;

alternative receiving means operatively connected to said network for receiving said alternative analog signal over said network at said first location;

second alternative converting means operatively connected to said alternative receiving means at said second location for converting said alternative analog signal to a alternative second digital signal having substantially the same information content as said alternative digital signal, alternative digital processing means operatively connected to said second alternative converting means for operating on the information content of said alternative second digital signal.

15. The system defined in claim 9, further including:

a third location substantially spaced from said second and said first location, and receiving means operatively connected to said network for receiving said analog signal over said network at a said third location;

third converting means operatively connected to said receiving means at said third location for converting said analog signal to a second digital signal having substantially the same information content as said first digital signal;

second digital processing means operatively connected to said third converting means for operating on said second digital signal, said second digital processing means operating on said second digital signal independent of said first digital processing means.

16. The system defined in claim 2, further comprising a source of control signals at said second location, and a control signal transmission system for transmitting control signals from said source across said network to a control signal destination at said first location, wherein said source generates said control signal as time variations in characteristics of infrared light energy, said transmission system further includes light sensitive electronics to re-express said variations in light characteristics as an electrical signal, the energy of said electrical signal being substantially confined within a frequency range that is different from and does not overlap said selected frequency band and the frequency band occupied by ordinary telephone signals, said electrical signal transmitting across said network while confined within said frequency range.

17. A signal transmission method comprising:

generating a first digital signal at a first location, and converting said first digital signal to an analog signal having substantially the same information content as said first digital signal, and transmitting said analog signal onto a twisted-pair telephone wiring network having a junction and at least three twisted-pair lines connected to one another at said junction, said network having a first port connected to a telephone exchange and a second port connected to a telephone device, and receiving said analog signal over said network at a second location substantially spaced from said first location, and converting said received analog signal to a second digital signal having substantially the same information content as said first digital signal, and digital processing said second digital signal, and at one of said first location and said second location, presenting a high impedance to signals whose energy is concentrated at frequencies below the highest frequency used for communication by ordinary telephone devices, while allowing said analog signal to transmit substantially unaltered.

18. The method defined in claim 17 wherein said converting includes expressing said analog signal within in a selected frequency range, said selected frequency range exceeding the highest frequency used for communication by ordinary telephone devices.

19. The method defined in claim 18, further including the expression of the information content of said first digital signal in the shifting between two discrete voltage levels, said expression including the response to said shifting to accomplish one of:

(a) frequency modulation of an analog carrier signal by shifting the frequency of said carrier between two frequencies, (b) creation of a time-varying analog signal that shifts regularly between two voltage levels, shifting from high to low in response to one of said two discrete voltage levels, and low to high in response to said other level, thereby creating a square wave with substantially all of its energy above the highest frequency used for communication by ordinary telephone devices.

20. The method defined in claim 17, further including the impeding of said analog signal from being coupled from said network to said telephone device.

21. The method defined in claim 17 wherein said transmitting further includes balancing said analog signal on said network wiring.

22. The method defined in claim 17, further including the reducing of interference owing to reflections of said analog signal in said network.

23. The method defined in claim 22, wherein said reducing further includes matching the impedance of said one of said twisted-pair lines at an open termination.

24. The method defined in claim 23, further including the insertion of a connector of a high-frequency device and the bypassing of said impedance matching in response to insertion of said connector.

25. The method defined in claim 23, wherein said converting includes expressing said analog signal within in a selected frequency range, said selected frequency range exceeding the highest frequency used for communication by ordinary telephone devices.

26. The method defined in claim 25, further including the impeding of said analog signal from being coupled from said network to said telephone device.

27. The method defined in claim 18, further comprising the transmitting of video information from a video source at said first location across said network to a video destination at said second location.

28. The method defined in claim 27, further including the expressing of said video information as a time-varying video signal substantially confined within a video frequency range that is different from and does not overlap said selected frequency band and the frequency band occupied by ordinary telephone signals.

29. The method defined in claim 28, wherein said expressing of said video information in said video frequency range is preceded by reception of said video information as a baseband video signal, and includes frequency modulating a carrier with said baseband video signal.

30. The method defined in claim 25, further including the reception of an alternative digital signal at said second location and the converting to a alternative analog signal having substantially the same information content as said alternative digital signal, and transmitting said alternative analog signal onto said wiring network at said second location, and receiving said alternative analog signal over said network at said first location, and converting said alternative analog signal to a alternative second digital signal having substantially the same information content as said alternative digital signal, and digitally processing said alternative second digital signal.

31. The system defined in claim 25, further including:

receiving said analog signal from said network at a third location substantially spaced from said second and said first location, converting said analog signal to a second digital signal having substantially the same information content as said first digital signal.

32. The method defined in claim 18, further comprising a source of control signals at said second location, and a destination of control signals at said first location, and further including:

generation of said control signal as time variations in characteristics of infrared light energy, and transmitting control signals from said source across said network to said destination at said first location, and re-expression of said variations in light characteristics as an electrical signal, the energy of said electrical signal being substantially confined within a frequency range that is different from and does not overlap said selected frequency band and the frequency band occupied by ordinary telephone signals, said electrical signal transmitting across said network while confined within said frequency range.

33. The system defined in claim 1, wherein one of said first location and said second location includes a means for presenting a high impedance to signals whose energy is concentrated at frequencies above the highest frequency used for communication by ordinary telephone devices, while allowing signals below said highest frequency to transmit unaltered.

34. The method defined in claim 17, further comprising presenting a high impedance to signals whose energy is concentrated at frequencies above the highest frequency used for communication by ordinary telephone devices, while allowing signals below said highest frequency to transmit unaltered at one of said first location and said second location.

35. A signal transmission system comprising:

a twisted-pair telephone wiring network having a junction and at least three twisted-pair lines connected to one another at said junction, said network having a first port connected to a telephone exchange and a second port connected to a telephone device;

signal generating means for generating an analog signal at a first location, transmitting means operatively connected to said signal generating means and said wiring network for transmitting said analog signal onto said network;

receiving means operatively connected to said network for receiving said analog signal over said network at a second location substantially spaced from said first location;

processing means operatively connected to said second location for operating on said analog signal; and at one of said first location and said second location, means for presenting a high impedance to signals whose energy is concentrated at frequencies below the highest frequency used for communication by ordinary telephone devices, while allowing said analog signal to transmit substantially unaltered.

36. The system described in claim 35, wherein said analog signal is a video signal.

37. A signal transmission method comprising:

generating an analog signal at a first location, and transmitting said analog signal onto a twisted-pair telephone wiring network having a junction and at least three twisted-pair lines connected to one another at said junction, said network having a first port connected to a telephone exchange and a second port connected to a telephone device, and receiving said analog signal over said network at a second location substantially spaced from said first location, and processing said analog signal, and at one of said first location and said second location, presenting a high impedance to signals whose energy is concentrated at frequencies below the highest frequency used for communication by ordinary telephone devices, while allowing said analog signal to transmit substantially unaltered.

38. The method described in claim 37, wherein said analog signal is a video signal.

* * * * *